United States Patent [19]

Weeks et al.

[11] Patent Number: 5,436,980
[45] Date of Patent: Jul. 25, 1995

[54] METHOD FOR DETERMINING QUALITY OF DISPERSION OF GLASS FIBERS IN A THERMOPLASTIC RESIN PREFORM LAYER AND PREFORM LAYER CHARACTERIZED THEREBY

[75] Inventors: Gregory P. Weeks; Akhileswar G. Vaidyanathan, both of Hockessin; Michael J. Merrill, New Castle, all of Del.

[73] Assignee: E. I. du Pont de Nemours and Company, Wilmington, Del.

[21] Appl. No.: 995,184

[22] Filed: Dec. 22, 1992

Related U.S. Application Data

[63] Continuation-in-part of Ser. No. 704,268, May 22, 1991, abandoned, which is a continuation-in-part of Ser. No. 315,836, Feb. 27, 1989, abandoned, which is a continuation-in-part of Ser. No. 192,364, May 10, 1988, abandoned.

[51] Int. Cl.⁶ .............................................. G06K 9/00
[52] U.S. Cl. ...................................... 382/141; 356/36
[58] Field of Search ...................... 382/1, 8, 22, 27, 18; 356/36, 73.1, 237–239; 264/40.1; 65/29; 348/92, 128

[56] References Cited

U.S. PATENT DOCUMENTS

| | | | |
|---|---|---|---|
| 3,063,883 | 11/1962 | Brissette | 154/43 |
| 3,910,105 | 10/1975 | Hoffstedt | 65/29 |
| 4,633,504 | 12/1986 | Wihl | 356/237 |
| 4,637,054 | 1/1987 | Hashim | 382/18 |
| 4,817,184 | 3/1989 | Thomason et al. | 382/22 |
| 4,975,970 | 12/1990 | Zettel et al. | 382/51 |
| 5,031,227 | 6/1991 | Raasch et al. | 382/22 |
| 5,101,440 | 3/1992 | Watanabe et al. | 382/22 |
| 5,113,454 | 5/1992 | Marcantonio et al. | 356/237 |
| 5,115,477 | 5/1992 | Groezinger | 382/8 |
| 5,142,592 | 8/1992 | Moler | 382/22 |
| 5,179,419 | 1/1993 | Palmquist et al. | 382/1 |
| 5,237,389 | 8/1993 | Hartrumpf | 356/238 |

OTHER PUBLICATIONS

Unexamined Japanese Patent Application No. 63-67551, Mar. 26, 1988.

Primary Examiner—Joseph Mancuso
Assistant Examiner—G. Del Rosso

[57] ABSTRACT

A method for determining the quality of dispersion of glass fibers in a thermoplastic resin preform layer compares the mean characteristic length of the glass fiber bundles in the preform layer to a predetermined value indicative of dispersion of the glass fibers. The thermoplastic resin preform layer characterized by this method comprises a plurality of individual glass fibers and some degree of undispersed glass fiber bundles intimately mixed with a plurality of discrete thermoplastic fibers. The glass fibers are introduced to the mixture having a length of about 1 cm. to about 8 cm. After mixing, some of the glass fiber bundles break up, and some residual glass fiber bundles remain. A preform layer which has acceptable dispersion has residual glass fiber bundles having a mean apparent length of less about 1.365 mm.

6 Claims, 18 Drawing Sheets

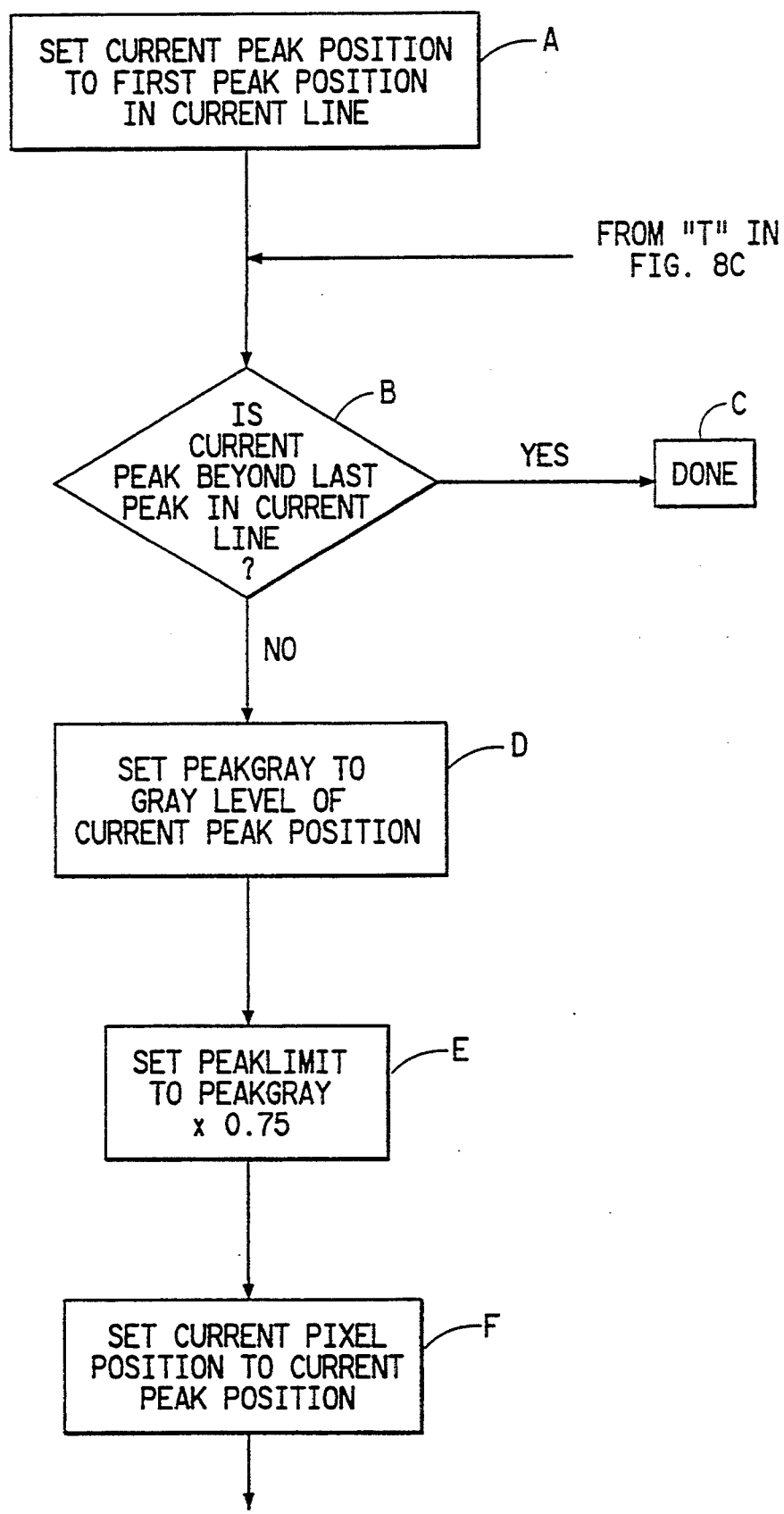

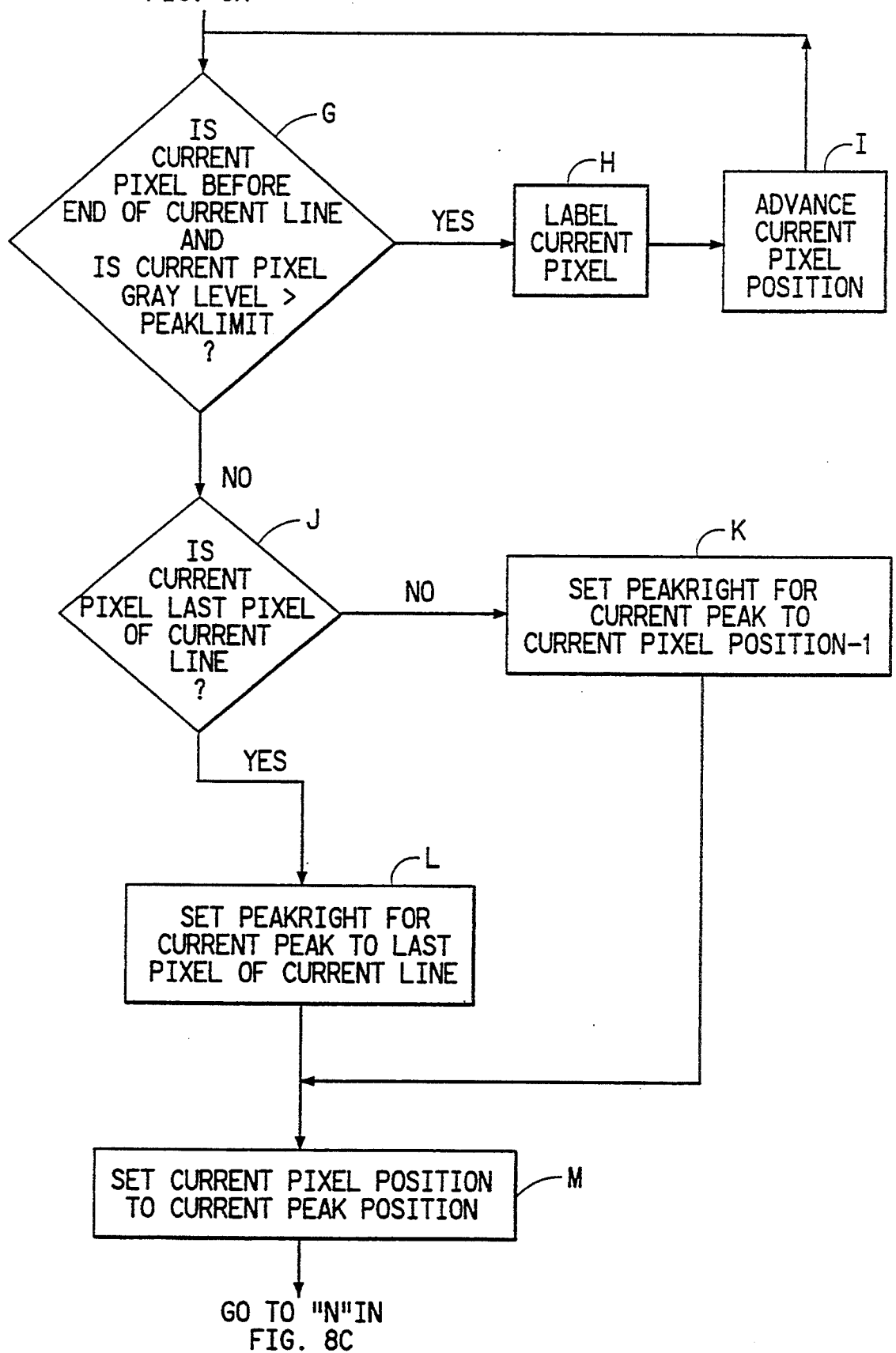

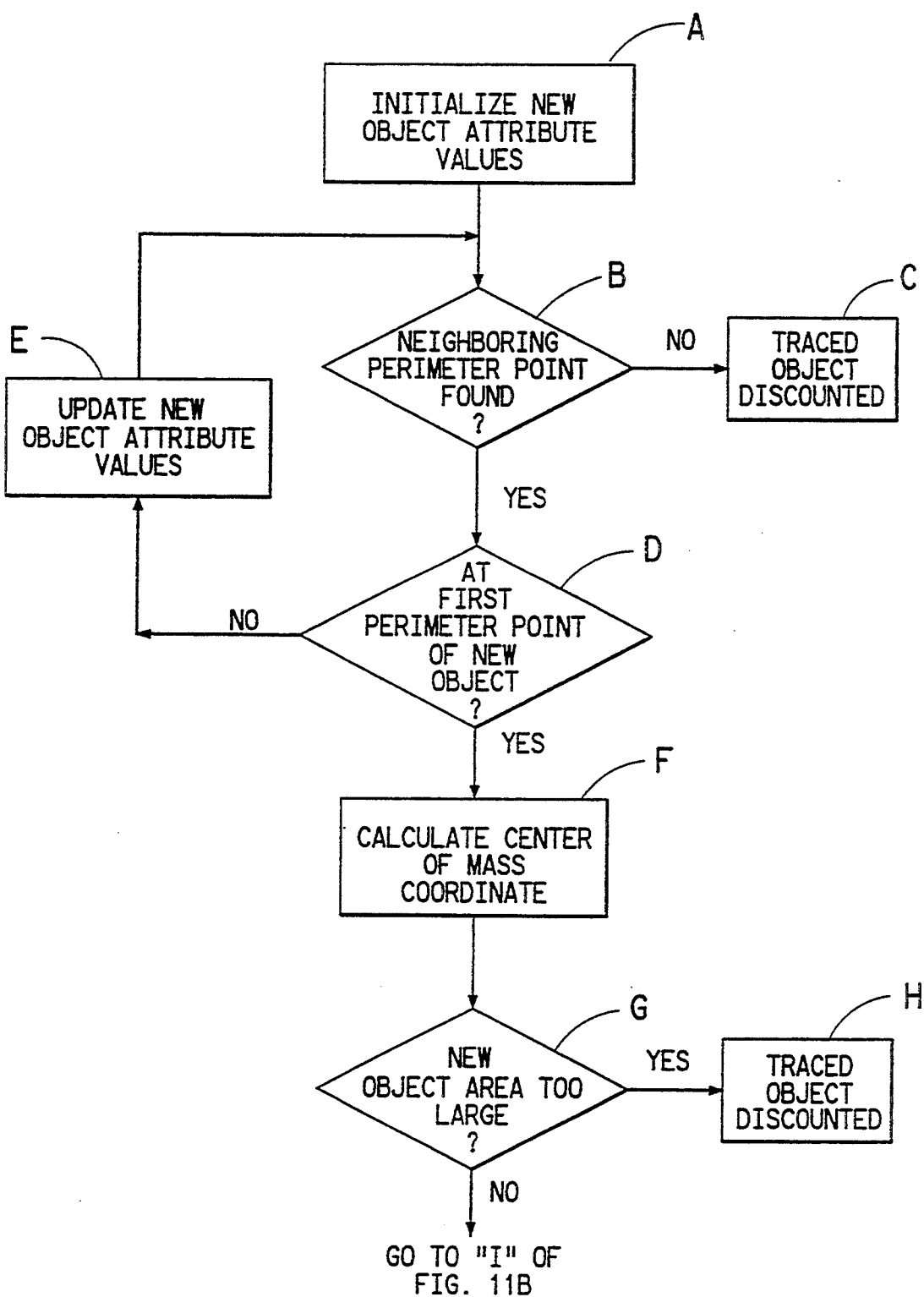

METHOD FOR DETERMINING QUALITY OF DISPERSION OF GLASS FIBERS IN A THERMOPLASTIC RESIN PREFORM LAYER AND PREFORM LAYER CHARACTERIZED THEREBY

RELATED APPLICATIONS

This application is a continuation-in-part of application, Ser. No. 07/704,268, filed May 22, 1991, now abandoned, which in turn is a continuation-in-part of application Ser. No. 07/315,836 filed Feb. 27, 1989, now abandoned, which in turn is a continuation-in-part of application Ser. No. 07/192,364 filed May 10, 1988, now abandoned.

MICROFICHE APPENDIX

Attached hereto are microfiche containing 36 frames of modules which can be employed in the described embodiments and in other embodiments of the present invention. These microfiche are included as a portion of the disclosure of this patent document.

COPYRIGHT NOTICE

A portion of the disclosure of this patent document contains material which is subject to copyright protection. The copyright owner has no objection to the reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to an image processing method for determining the quality of dispersion of glass fibers in a thermoplastic resin preform layer where the glass fibers have been introduced as glass fiber bundles. The present invention also relates to a thermoplastic resin preform layer comprising a plurality of individual glass fibers and some degree of undispersed glass fiber bundles intimately mixed with a plurality of discrete thermoplastic fibers characterized by this method.

2. Description of the Related Art

Glass fiber-reinforced preform sheets, or layers, are commercially valuable materials used in the compression molding industry for fabrication of automotive components, such as bumper beams and structural panels. Such preform sheets generally comprise a blend of thermoplastic resin with glass-reinforcing fiber bundles, or tows. Typically, the preform sheets are trimmed to appropriate dimensions, are preheated to melt the thermoplastic component, and are then placed in a matched metal die for forming under heat and pressure. A desirable goal is the ability to compression mold panels from wet-formed glass reinforced thermoplastic preform sheets, such that the resulting molded plaques have sufficient surface smoothness for applications such as exterior automotive panels.

Glass fiber-reinforced resin laminates are known in the art, as exemplified by U.S. Pat. No. 3,063,883 to Brissette. This patent discloses a glass fiber preform mat for use in the production of reinforced resin laminates, which will completely wet-out with an impregnating resin. Brissette is not concerned with compression molding the laminate into a composite plaque and accordingly, is not concerned with the surface uniformity of the molded plaque.

Although Brissette does disclose an even dispersion of co-polymeric fibers with glass fibers, it contains no discussion of the degree of dispersion of the glass fibers. Instead, Brissette makes a visual determination that an intimate fiber blend is achieved, which is unreliable, since it is subjective. In Brissette, there is no quantification of the degree of dispersion of glass fibers. Indeed, most any dispersion technique will leave some small fraction of the glass fiber as partially undispersed bundles. Since even a small percentage of glass fiber bundles can render a preform sheet unusable for applications requiring a very smooth surface in a molded plaque, it is highly desirable to define a technique which provides a reliable, quantitative measurement of dispersion.

SUMMARY OF THE INVENTION

Accordingly, the present invention solves the problems of the prior art by providing a quantitative method for determining the quality of dispersion of glass fibers in a thermoplastic resin preform layer. This quantitative method can be used to characterize the preform layer (i.e., whether the preform layer has acceptable dispersion), which is especially useful for applications such as automotive panels.

To achieve the foregoing solutions, and in accordance with the purposes of the invention as embodied and broadly described herein, there is provided a method for determining the quality of dispersion of glass fibers in a thermoplastic resin preform layer, where the glass fibers have been introduced as glass fiber bundles. The method comprises the steps of: generating an image of a sample of a thermoplastic resin preform layer comprising a plurality of individual glass fibers and residual glass fiber bundles intimately mixed with a plurality of discrete thermoplastic fibers, wherein the image and has a gray level intensity distribution; applying an edge detection filter to enhance the edges of the glass fiber bundles in the generated image; applying a smoothing filter to the enhanced image to reduce the random fluctuations in the gray level intensity distribution in the image; scanning each line in the smoothed image for peaks in the gray level intensity distribution; labeling the regions in the image corresponding to the peaks with a predetermined gray level; searching the labeled image using a selected threshold gray level to locate the edges of the glass fiber bundles, wherein the selected gray level is greater than the maximum gray level of the thermoplastic fibers and less than the predetermined gray level of the labeled regions; tracing the edges of the glass fiber bundles; calculating a mean characteristic of the glass fiber bundles; and comparing the mean characteristic of the glass fiber bundles in the sample to a predetermined value indicative of the dispersion of the glass fiber bundles in the thermoplastic resin preform layer to determine the quality of dispersion of the glass fibers.

Further in accordance with the present invention, there is provided a thermoplastic resin preform layer comprising a plurality of individual glass fibers and some degree of undispersed glass fiber bundles intimately mixed with a plurality of discrete thermoplastic fibers, wherein the glass fibers are introduced to the mixture as glass fiber bundles having a length of about 1 cm. to about 8 cm. and the residual glass fiber bundles, after mixing, have a mean apparent length of less than about 1.365 mm.

BRIEF DESCRIPTION OF THE DRAWINGS

FIGS. 1 and 1A are schematic illustrations of one embodiment of the wet laying process used to make the thermoplastic resin preform layer of the present invention.

FIGS. 8A-8C are a flow chart showing the steps of a module, LABEL PEAKS, used in accordance with the method of the present invention.

FIGS. 11A and 11B are a flow chart showing the steps of a module, TRACE OBJECT, which is used to trace and validate objects.

DETAILED DESCRIPTION OF THE PREFERRED EMBODIMENTS

Figure 1:
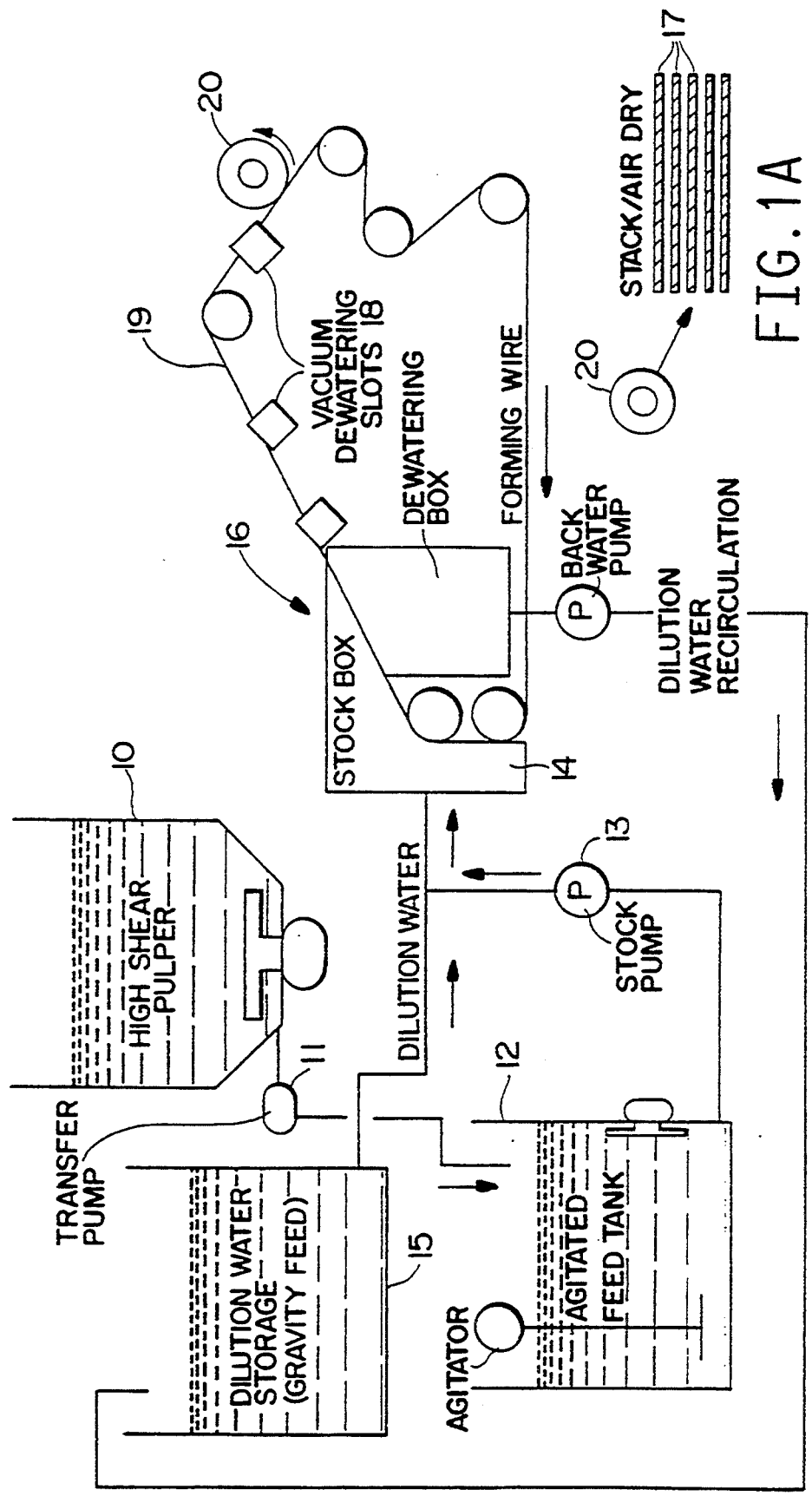

FIG. 1 illustrates a wet laying process used to make a thermoplastic resin preform layer of the present invention. This process utilizes paper making equipment and generally includes, a pulper 10, an agitated supply tank 12, the head box 14 of an inclined wire paper machine 16, a dewatering section 18, and a windup or driven spool 20. In operation, glass and thermoplastic fibers are dispersed in water in pulper 10. The slurry is pumped via pump 11 from the pulper to an agitated supply tank 12. Feed stock from the supply tank is then pumped by means of pump 13 to the head box 14 where dilution water is added from tank 15 reducing stock consistency by a factor of 5. The slurry is drained through the wire in the usual manner and dewatered by passing over suction slots 18 in the dewatering section. The dewatered sheet 19 is then wound in damp form on driven spool 20. The sheet wound on the spool 20 is unwound in layers 17 and air dried as schematically shown in FIG. 1A.

Figure 2:
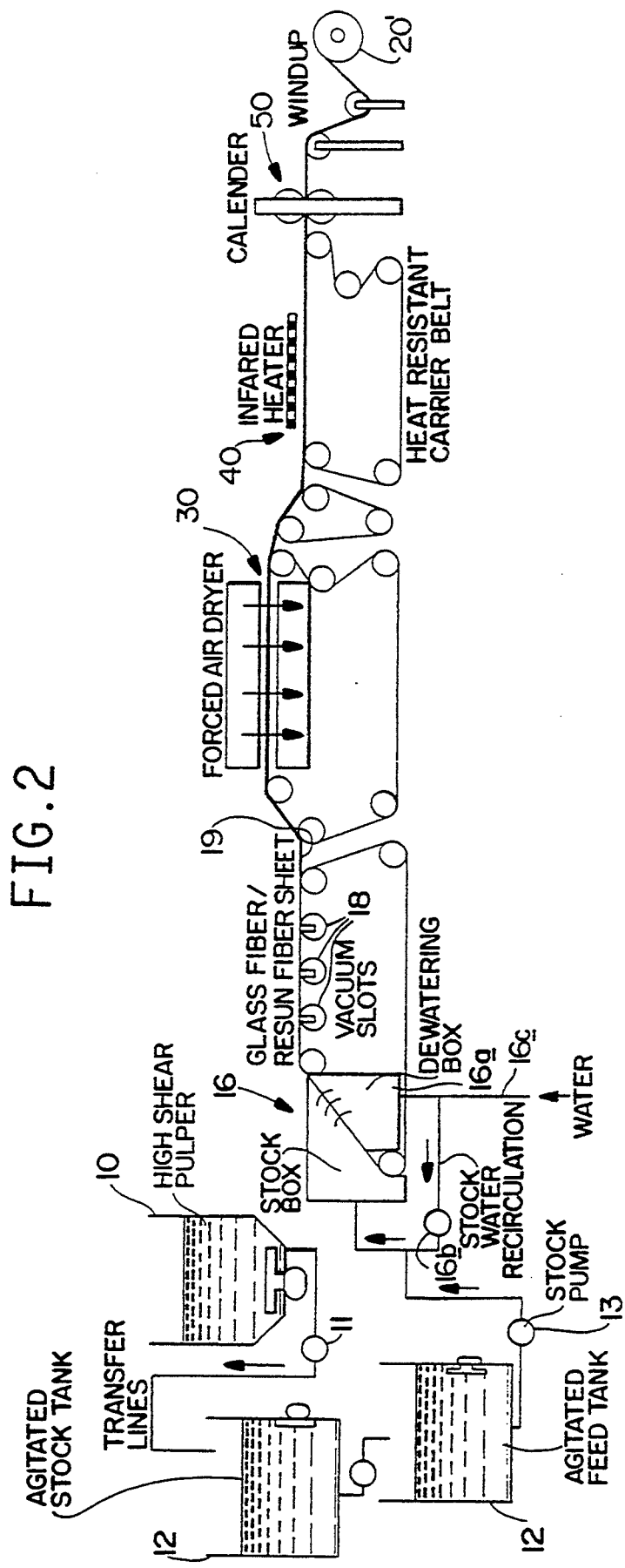
FIG. 2 is a schematic of another embodiment of the wet laying process used to make the thermoplastic resin preform layer of the present invention.

In an alternate embodiment used in large scale production, the slurry consistency is reduced by a factor of 3-5 with dilution water on being pumped to the feed tanks 12 and further reduced by a factor of 8-10 with additional dilution water from the dewatering box 16a and pipe 16c via pump 16b as substantially shown in FIG. 2, after the sheet 19 is passed over vacuum suction slots 18, it is then dried by passing it through a flat, forced air or circular dryer 30 at a temperature of about 500° F. The sheet 19 is then passed under infrared drying element 40 through nip rolls and then wound on spools by windup 20'.

TABLE I

| Papermaking Equipment | | | |
|---|---|---|---|
| Element Number | Name | Model No. | Manufacturer |
| 10 | Pulper | GP 157 | Bird Machine Co., Inc. South Walpole, MA |
| 13 | Pump | 23B2-B | Gorman-Rupp Mansfield, OH |
| 16 | Papermaking Machine | Labor 23" | Neuf Bruderhaus Reutlingen, W. Germany |

The thermoplastic preform layer of the present invention is formed on conventional papermaking equipment where the forming section of the machine is preferably of the type known as an inclined wire, i.e. the slurry is drained through a forming wire which is inclined at an angle (usually 15° to 45°) into the forming slurry. Such equipment is specifically designed to be capable of forming fibrous mats at moderate to high slurry dilutions and is ideal for processing long (1-8 cm.) fiber bundles into nonwoven layers, or mats. However, other machine styles can be used as well, such as cylinder-formers and others. Sheet drying can be accomplished via a combination of thru-air drying, contact drying, or radiant heat. The maximum temperature reached by the fibrous mat must be sufficient to activate "tacking" of a suitable fraction of the resin fiber to achieve sufficient mat strength for good processability.

The preferred preform layer process consists of co-dispersing the glass wet chop fiber in a conventional papermakers pulper, followed by deposition on a wire, dewatering, drying, and heating to a temperature sufficient to active the binder copolymer, optionally light calendaring the sheet, and winding it on a mandrel.

Reinforcing Fiber

The glass reinforcing fiber used in making the preform layer of the present invention consists of conventional spun glass strand having a diameter between 5 and 50 microns and a cut length of 1 cm to 8 cm., when introduced into the thermoplastic fibers. As is common in the industry, such glass strand is produced by forming filaments from a heated bushing and several hundred to several thousand such filaments are grouped below bushing where a size is applied to the filaments to meet the requirements of downstream processing. The size consists of a solution or aqueous dispersion of at least a film forming agent, such as a low molecular weight polyester or polyurethane, to protect the glass, and a coupling agent, usually a silane compound such as alpha-aminopropyltriethoxysilane, which is chosen to assist adhesion between the glass/resin interface in the final composite. Typically, this sized strand is chopped to length and shipped "wet" in moisture-proof containers to the papermaker. The preferred size material composition is that sold by Owens-Corning Fiberglass (OCF) under the label 133A. Wet chop strand fiber bundles such as this will not disperse well in an aqueous slurry at neutral pH. However, co-dispersion of the wet chop strand with wettable thermoplastic fiber in a neutral pH slurry surprisingly achieves good glass fiber bundle dispersion, resulting in an advantageous intimate mixture individual glass fibers and some degree of undispersed glass fiber bundles intimately mixed with discrete resin fibers.

Resin Fiber

The resin fiber component consists preferably of a fine (0.5–20 denier), short cut (1–5 cm) discrete polyester, polyamide, polypropylene, or polyethylene thermoplastic staple fibers, possibly containing precompounded additives such as an antioxidant and toughner and other ingredients intended to enhance composite properties. Alternatively a portion of the thermoplastic fibers are composed of, or have a sheath coating of, a somewhat lower melting thermoplastic of substantially the same composition, which acts as a heat activated binder during the drying process. Optionally, the thermoplastic fibers (e.g., polyester fibers) may be surface treated with less than 1% of a dispersing aid such as, but not limited to, long chain alkyl phosphates, condensation products of tallow alcohols with polyethylene oxides, and low molecular weight polyesters.

Fiber Dispersion

The dispersion of the fiber is carried out in a conventional paper-maker pulper using water at pH 5.5–8.5 at a consistency of 0.25 to 2% by weight solids. Glass-to-resin ratio is preferably between 1/5 to 5/1 and usually in a range of 1/3 to 1/1. A good dispersion can be carried out by either co-dispersing or preferably first dispersing the resin fiber. The preferred procedure is to disperse the wettable thermoplastic fiber first for 10 minutes in conventional high shear pulper, followed by addition of the wet chop glass strand with an additional 10 minutes of agitation.

Post Processing of the Preform Layer

The preform layer is usually not thick enough as produced to be used directly to make composite parts. Typically several preform layers will be sheeted and stacked to produce a thickness (usually in the range of 0.5 to 2.0 pounds per square foot) which is suitable for molding.

Molding of Composite Sheets

Several layers of the resulting sheet can be layered together and placed in a mold and made into a plaque to evaluate physical properties. For condensation polymers, such as poly(ethylene terephthalate), the material is dried to <0.02% moisture level prior to molding. It is then placed in a picture frame mold coated with mold release agent. The mold and contents are then placed in the heated platten press at 15 psi, and the mold temperature brought to above the resin melt temperature. The pressure is then increased to 500 psi, and the mold and contents are allowed to cool under pressure. The sheet is then removed and ultrasonic scan data, tensile data, and stiffness data are then obtained by the usual methods.

Molding of Composite Components

To obtain useful articles from the preform layer in stacked nonwoven form or consolidation sheet form, one or more compound preform layers are heated by conventional (contact, IR, or forced gas) means to remelt the matrix resin, being careful to dry the sheet first in the case of condensation polymers. The molten resin and glass reinforcing fiber sheet is placed in a compression mold or stamping press. The material may be squeezed under pressure to shape or flow mold the part, at which time the resin is cooled and the part removed.

TEST METHODS

The following test methods were used to measure the properties of the thermoplastic resin preform layer of the present invention.

Tensile strength

Standard Test Method for Tensile Properties of Plastics (ASTM D638-84).

Flex Modulus

Standard Test Methods for Flexaral Properties of Unreinforced and Reinforced Plastic Materials (ASTM-D790-84a).

Determination of Degree of Co-Dispersion

Step 1: Select a Representative Sample of the Composite Preform Layer for Analysis Step 2: Sample Preparation Carefully pot the sample in a clear epoxy resin being careful not to disturb the fiber structure. This can be accomplished by placing a roughly 1 cubic inch sample in a small cup, carefully filling the cup with a two-part epoxy resin having an initial viscosity of less than 10 poise, and placing the cup in a vacuum chamber to insure good impregnation. Allow the epoxy to cure. Cut a cross section through the potted sample and polish for microscopic inspection.

Step 3: Prepare Photomicrographs Prepare photomicrographs of the sample cross section showing the distribution of glass and the thermoplastic fiber ends using standard optical microscopy techniques. Such a photomicrograph is represented by FIG. 3 wherein glass fiber ends 100 are shown dispersed with thermoplastic fiber ends 200.

Step 4: Determine Sample Area

Figure 3:
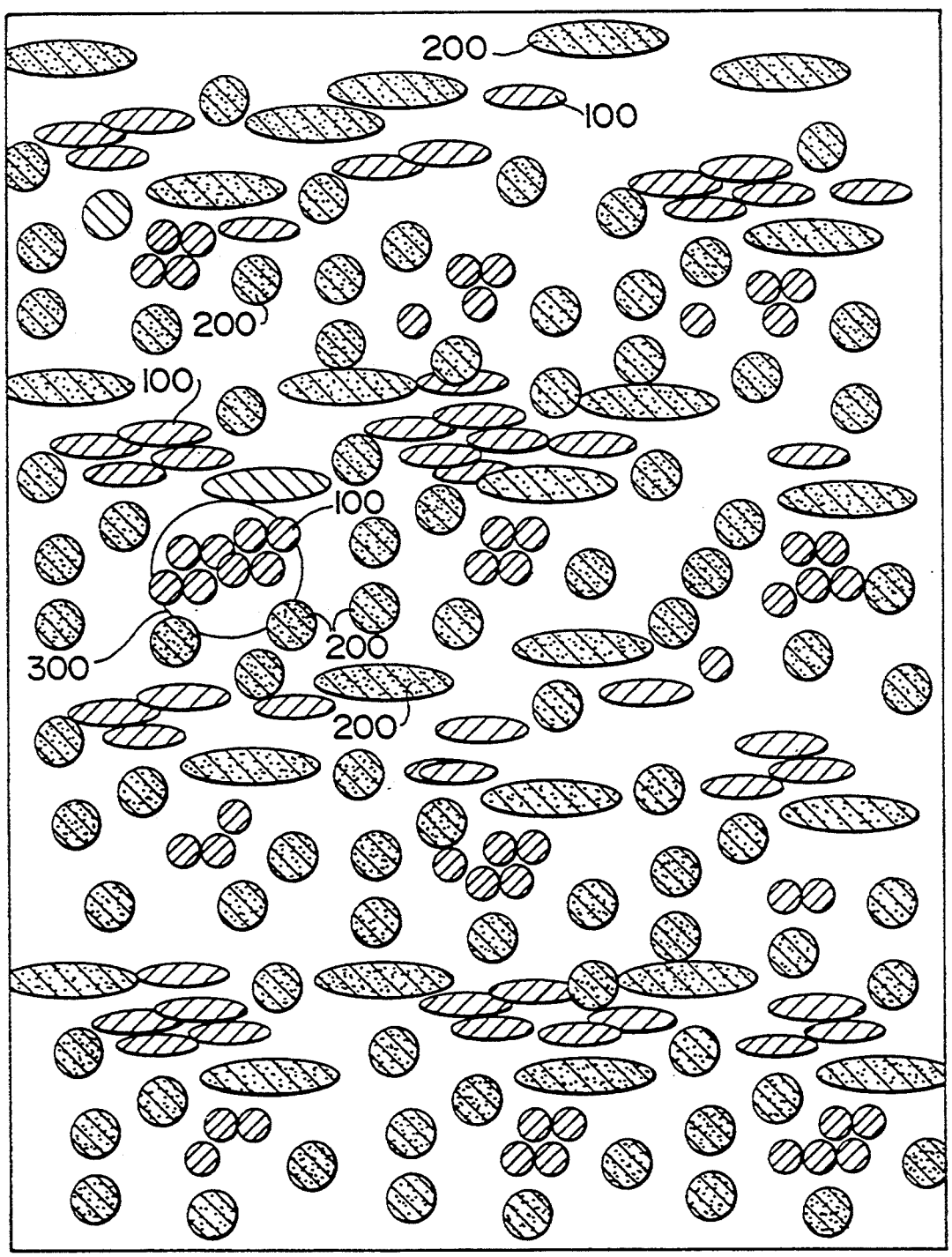
FIG. 3 is a schematic area of a photomicrograph showing the distribution of glass and thermoplastic fiber ends in the thermoplastic resin preform layer of the present invention.

Using the photomicrographs, select a sampling area such as FIG. 3 which contains a large number of both thermoplastic and glass fibers and residual glass fiber bundles, such that the ratio of glass to thermoplastic fiber ends is close to the calculated fiber ratio. The "fiber ratio" FR is defined as:

$$FR = (\text{No. TP Fiber Ends/No. Glass Fiber Ends}) = \frac{(\% \text{ Wt. } TP) \cdot (\text{Glass Density}) \times (\text{Glass Fiber Length}) \times (\text{Glass Fiber Diameter})^2}{(\% \text{ Wt. Glass}) \times (TP \text{ Density}) \times (TP \text{ Fiber Length}) \times (TP \text{ Fiber Diameter})^2} \quad (1)$$

Step 5: Determine the Glass bundle Dispersion Index( GBDI )

Inspect the sample area and determine the largest number of glass fiber ends, which can be captured in an imaginary circle 300 without capturing a thermoplastic fiber end. Repeat for at least five separate viewing areas. Calculate the glass bundle dispersion index as follows:

$$GBDI = \frac{\text{Original No. Fibers/Bundle}}{\text{Average No. Fibers/Bundle in Perform Layer}} \quad (2)$$

Where the original chop strand bundle count can be calculated as below or by direct count:

$$\text{Original No. Fibers/Bundle} = 2.5 \times 10^6 / (\text{Count} \times \text{Dia.}^2 \text{ (Microns)}) \quad (3)$$

wherein count is the number of 100 yds. per lb. in the original strand.

C-Scan—Void Content

As an indication of the final consolidated composite density and uniformity of consolidation, the composite plaque were evaluated using an ultrasonic scanning system.

Ultrasonic scanning equipment is available from:

Testech, Inc. 115 Sunset Drive P.O. Box 960 Exton, Pa.

The method used was the "C" or area scan method. Frequency used was 5 mHz. The mode used was transmission through sample plaque of size 7"×7"×0.125" thick emersed in water tank. This method is also known as the pitch-catch method. This DB (loss) is measured and plotted using a color coding system over the full plaque surface to evaluate relative density and uniformity prior to evaluation of tensile and flex properties. DB loss is defined by the following formula:

$$\text{DB loss} = 20 \text{ Log10 AG/AR} - (GS - GR) \quad (4)$$

AG is the signal amplitude through the sample.
AR is the off-sample reference amplitude.
GS and GR are amplifier gain on and off sample
−1 DB is 10% amplitude reduction
−6 DB is 50% amplitude reduction
−20 DB is 90% amplitude reduction
Signal loss in DB due to uniform porosity is proportional to thickness after accounting for reflective losses which are small for this system used about 1 DB). Therefore C-scan data are reported in DB loss/inch material thickness. DB loss values of 35 DB/inch are considered excellent and represent a well consolidated plaque. This corresponds to a void content of 5–7% as measured by bulk density techniques.

Denier

The weight in grams of 9000 meters of linear material.

Determination of Surface Smoothness

A profilometer measurement was made to measure the maximum height of defects caused by undispersed bundles of glass fibers in the preform layer. A profilometer, Federal Surface Analyzer, Model No. 4000 with a diamond stylus of radius 0.0004 inch was used to make this measurement.

Image Analysis for Determination of Quality of Dispersion

Further in accordance with the present invention, there is provided a method for determining the quality of dispersion of glass fiber bundles in a thermoplastic resin preform layer. The steps of the overall method are illustrated in FIG. 4.

In order to prepare a sample of a thermoplastic resin preform layer for image analysis, the method of the present invention may initially comprise the step of heating the layer, in for example, a forced air oven, to melt the thermoplastic fibers and further reveal the structure of the glass fibers in the layer.

Figure 4:
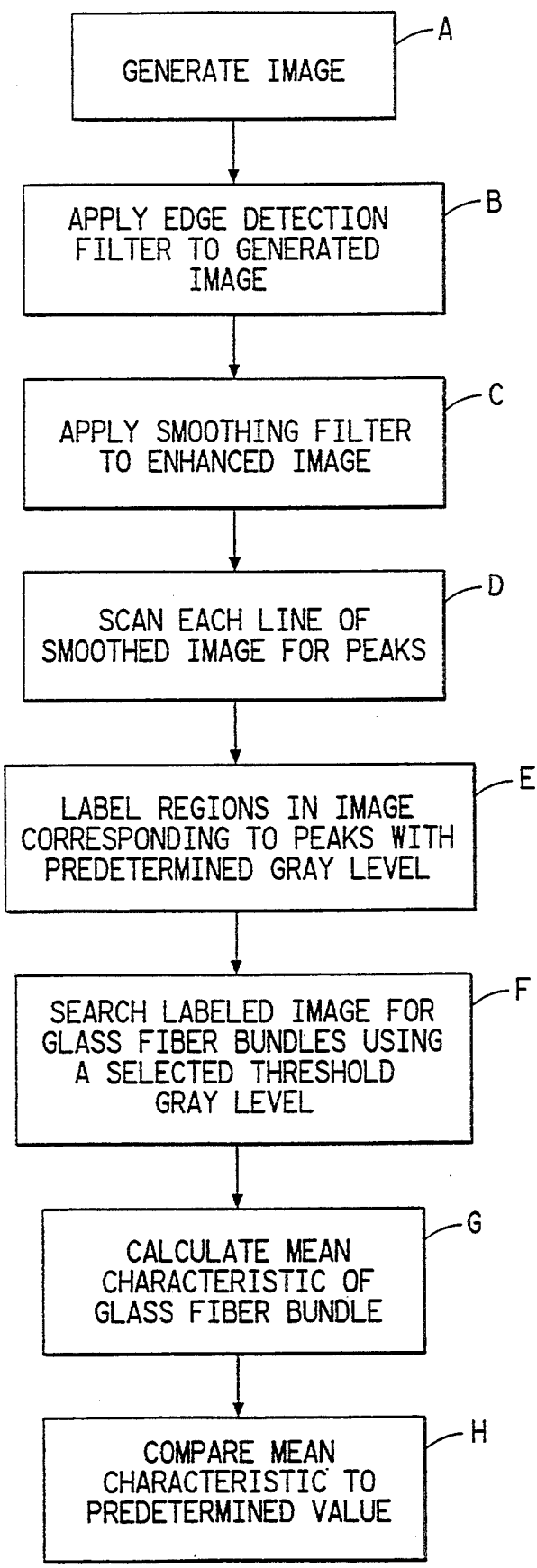
FIG. 4 is a flow chart showing the steps of the overall method of the present invention.
Figure 5:
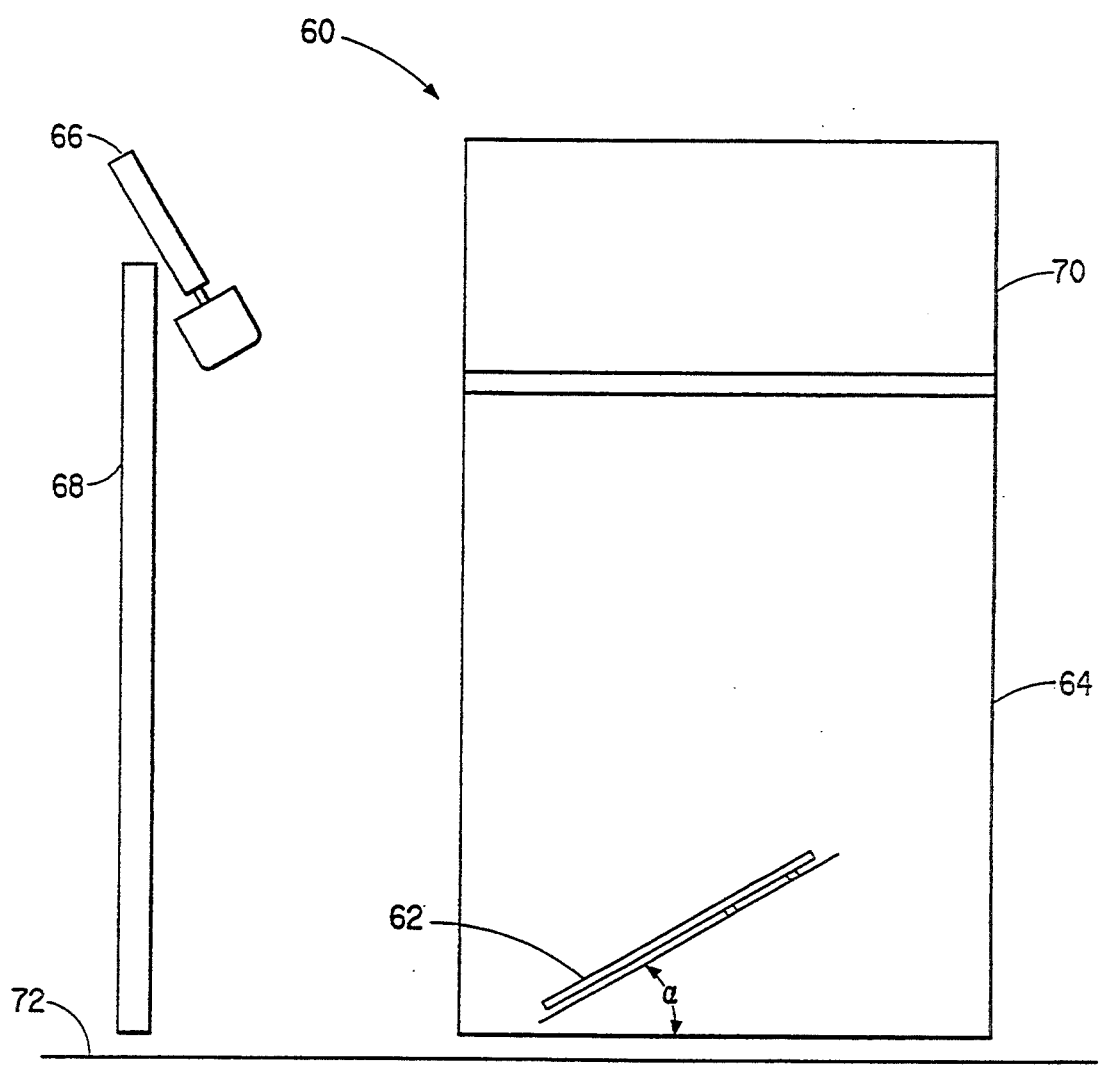
FIG. 5 is a schematic of a system used to generate an image of the preform layer according to the present invention.

As shown in block A of FIG. 4, the first step of the method is to generate an image of a sample of the thermoplastic resin preform layer. The layer comprises a plurality of individual glass fibers and some degree of undispersed glass fiber bundles intimately mixed with a plurality of discrete thermoplastic fibers as described above. The image has a gray level intensity distribution. The image may be generated by a camera. The apparatus used for imaging a sample of the composite preform layer is illustrated in generally at 60 in FIG. 5. System 60 comprises a sample 62 which is held in a sample holder 64. The sample was weighted to flatten it. System 10 also comprises a camera 66 which generates an image of the sample and which is held on a stand 18. In a preferred embodiment, the camera was a Sony XC-77 CCD camera, although any type of camera, or more generally, any type of device for generating an image may be used. System 60 also comprises a light illumination source 70 for illuminating the sample. An example of a light illumination source suitable for use with the present invention is a Macbeth Spectra Light SPL-6t Light Box. The Macbeth lightbox was operated using one of the standard settings, known as the "horizon lighting" setting. The measurement of dispersion measured by the method of the present invention is based on this horizon lighting. In principle, other light settings could be used. Reflection light was used to generate the image. Sample holder 64 and stand 68 rest on a base 72 as shown in FIG. 5. A Microvax II computer, not illustrated, is used for subsequent analysis of the image. Preferably, the sample is oriented so that the axis of the sample is at an oblique angle with respect to light illumination source 70. As shown in FIG. 5, the sample is oriented at an angle, $\alpha$, with respect to the base of the sample holder, where $\alpha$ is preferably about 25°.

The method of the present invention also comprises the step of applying an edge detection filter to enhance the edges of the glass fiber bundles in the image in the image generating step. This step is shown generally in block B of FIG. 4. An example of an edge detection filter suitable for use with the present invention is a 3×3 La Placian kernel as described in "Digital Image Processing" by Rafael C. Gonzalez and Paul Wintz, Second Ed., Addison-Wesley Publishing Company, Reading, Mass. (1987).

The method of the present invention also comprises the step of applying a smoothing filter to the enhanced image to reduce the random fluctuations in the gray level intensity distribution of the image. This step is shown generally in block C of FIG. 4. Two sources of such random fluctuations are variations in light intensity and "shot noise" associated with a CCD camera, as is familiar to one skilled in the art. This applying step may be done by, for example, convolving the image with a 3×3 low-pass filter as described in Gonzalez and Wintz, supra.

Figure 4A:
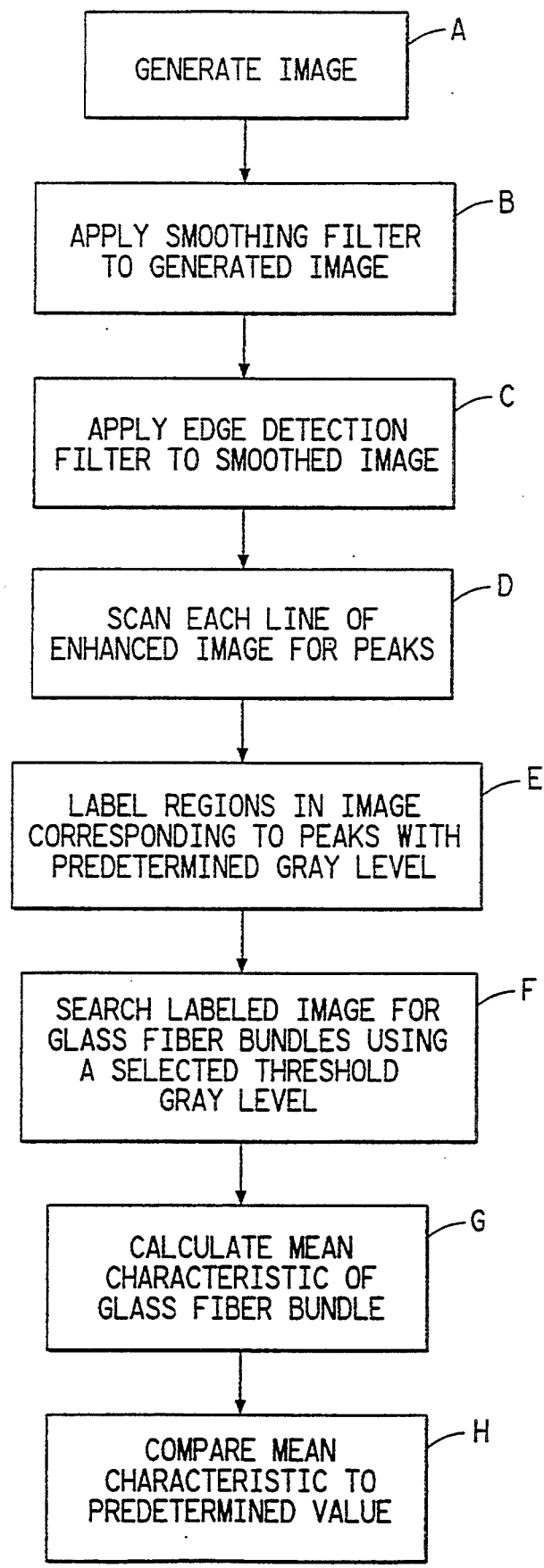
FIG. 4A is a flow chart showing the steps of an alternative overall method of the present invention.

In the present invention, the step of applying a smoothing filter may be performed before the step of applying an edge detection filter. This modification is shown in in blocks B and C of FIG. 4A, with all other steps of the overall method being the same as those described with respect to FIG. 4. The smoothing filter is applied to the generated image to reduce the random fluctuations in the gray level intensity distribution of the generated image as shown in block B of FIG. 4A. The edge detection filter is then applied to the smoothed image as shown in block C of FIG. 4A to enhance the edges of the glass fiber bundles in the smoothed image.

Figure 6:
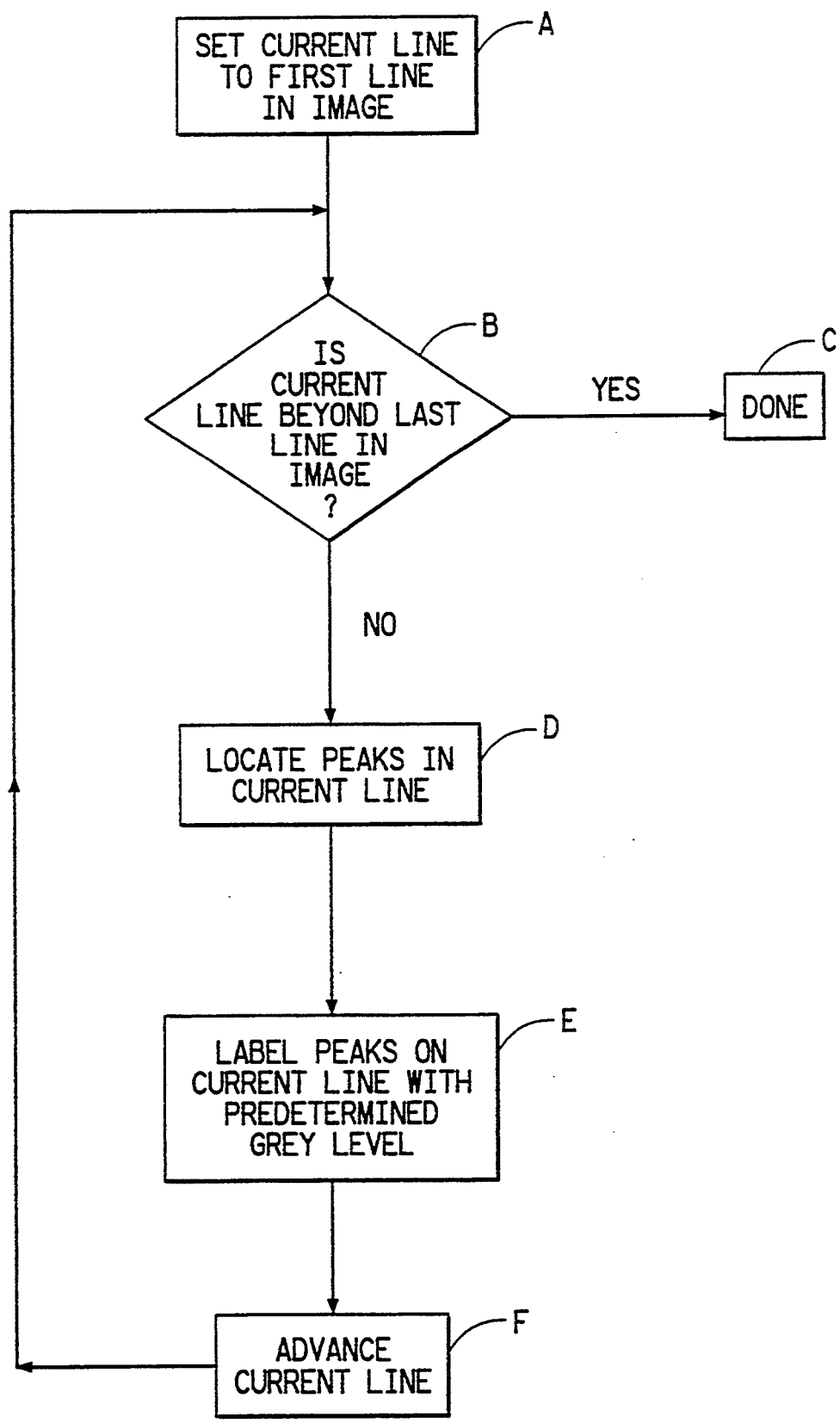
FIG. 6 is a flow chart showing the steps of a module, ENHANCE, used in accordance with the method of the present invention.

The method of the present invention also comprises the steps of scanning each line in the image for peaks in the gray level intensity distribution and labeling regions in the image corresponding to the peaks with a predetermined gray level. When the edge detection filter is applied before the smoothing filter, the scanning step comprises the step of scanning each line in the smoothed image for peaks in the gray level intensity distribution. When the smoothing filter is applied before the edge detection filter, the scanning step comprises the step of scanning each line in the enhanced image for peaks in the gray level intensity distribution. These steps are shown generally in blocks D and E of FIG. 4 and are performed by an umbrella module, ENHANCE, which is illustrated in FIG. 6 and in detail in the flow charts of FIGS. 7A–7C and 8A–8C. As shown in block A of FIG. 6, the first step in the ENHANCE is to set the current line to the first line in the image. Decision diamond B then asks whether the current line is beyond the last line in the image. If it is, then the module is done as shown in block C. If the current line is not beyond the last line in the image, then the peaks in the current line are located as shown in block D. The peaks on the current line are then lebeled with a predetermined threshold gray level as shown in block E, and the current line is advanced as shown in block F. The loop through decision diamond B and blocks C–F continues until the current line is beyond the last line in the image, at which point, the module ENHANCE is done as shown in block C.

Figure 7A:
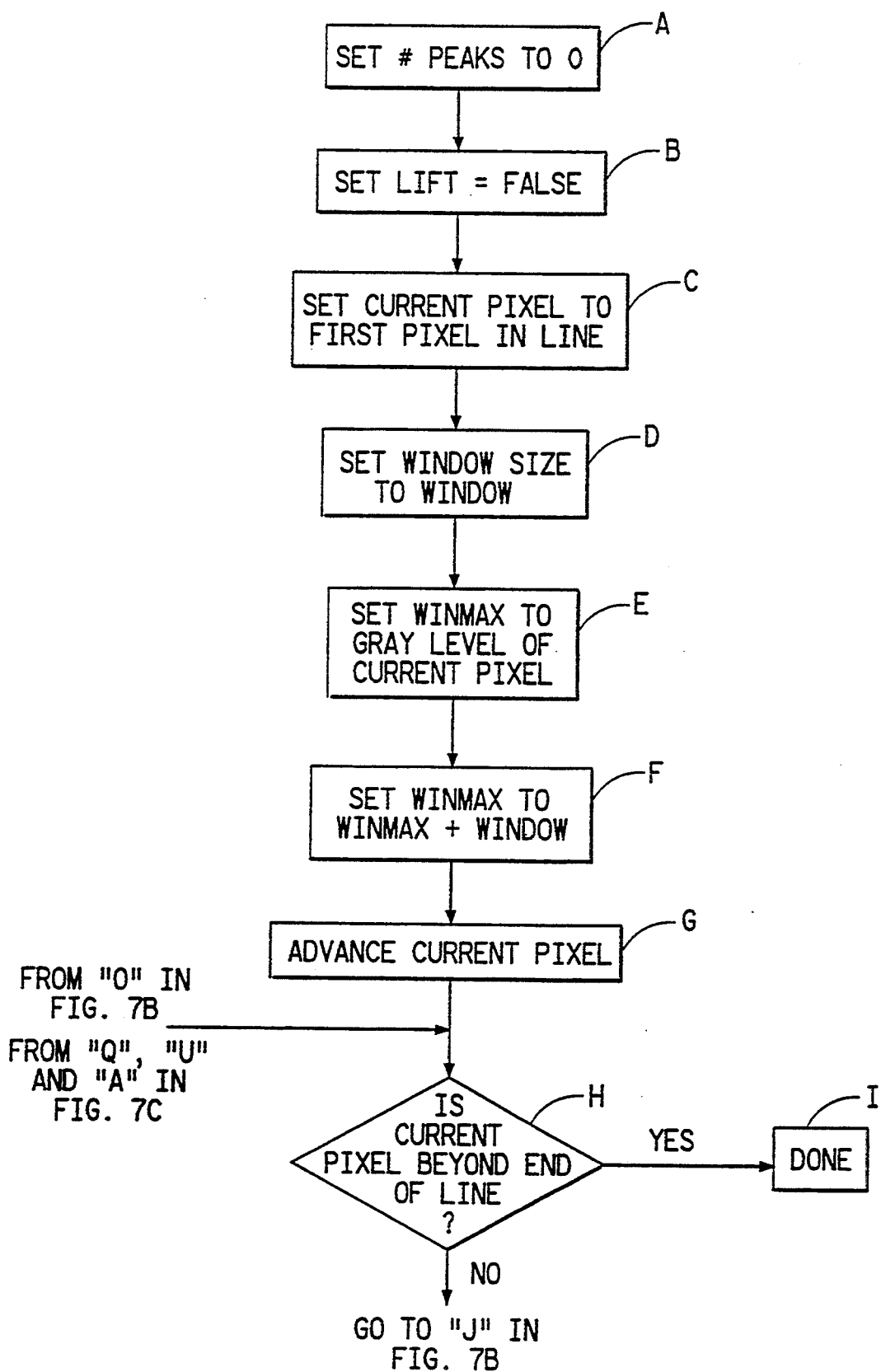
FIGS. 7A-7C are a flow chart showing the steps of a module, LOCATE PEAKS, used in accordance with the method of the present invention.

The steps of scanning each line in the smoothed or enhanced image for peaks in the gray level intensity distribution are performed by a module, LOCATE PEAKS, as illustrated in FIGS. 7A—7A. The step of labeling the peaks with a predetermined gray level is performed by a module LABEL PEAKS as illustrated in the flow chart of FIGS. 8A–8C.

By running the module ENHANCE, peaks are identified by scanning each line in the image for peaks, which are maximum values in the gray level distribution of the image. The peaks are labeled, or "filled" by examining all pixels on either side of the peak on the same line. In the preferred embodiment, all the neighboring pixels whose gray level values are greater to or equal to 0.75 ×the gray level value of the peak are then "labeled" with a predetermined gray level value. For the preferred embodiment of the present invention that value was selected to be 225. As a result, all peaks in a given line are "filled in" to their 75 percent points. The net result of the scanning and labeling steps, i.e., enhancement, is to have the edges in the image (corresponding to the glass fiber bundle locations) and the immediate vicinity of the edges (corresponding to those pixels where the gray levels are within 25% of the edge intensities) labeled with a predetermined gray level.

The step of scanning each line in the image for peaks in the gray level intensity distribution uses a hysteresis-based, peak-finding algorithm. A hysteresis-based, peak-finding algorithm is an algorithm known to one skilled in the image processing art to identify the peak values in a set of data where there may be fluctuations in the values of the data points. To ensure that spurious peaks are not found in the data set, a hysteresis "window" is defined with a certain width of values. For a peak to be counted as a true peak, two conditions must be satisfied: (a) the value of the peak data point must be at least one window width above values of points prior to the peak; and (b) the value of data points subsequent to the peak must fall at least one window width below the peak value before they start to rise. This ensures that small ripples in the data with amplitudes less than the window width are not included as peaks.

In the scanning step of the method of the present invention, to ensure that spurious peaks are not identified, a hysteresis "window" is defined with a certain range of values. For a peak to be a true peak, two conditions must be satisfied:
1. The value of the peak data point must be at least one window width above the value of a point prior to the peak.
2. The value of data points subsequent to the peak must fall at least one window width below the peak value before they rise.

The window width for the preferred embodiment of the method of the present invention was defined as:

$$\text{Window width} = (\text{MAXGRAY} - \text{MINGRAY}) \times 0.3 \qquad (5)$$

where "MAXGRAY" represents the maximum gray level intensity of a line being scanned and "MINGRAY" represents the minimum gray level intensity of a line being scanned. The factor of 0.3 in equation (5) above is a sensitivity factor which determines the sensitivity of the image analysis system which is used to locate peaks. By imposing the above conditions on locating a peak, small ripples in the data with amplitudes less than the window width are not identified as peaks.

Figure 7B:
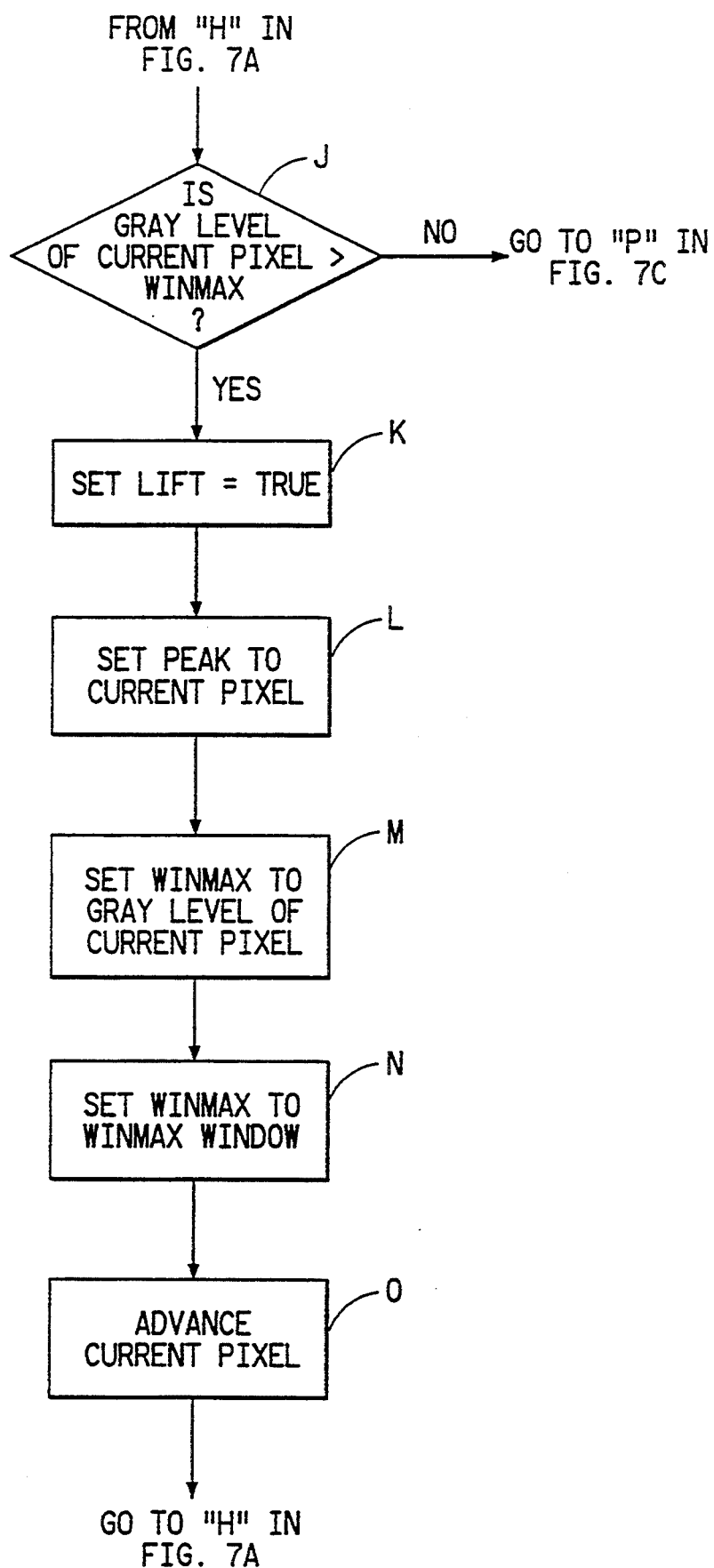
Figure 7C:
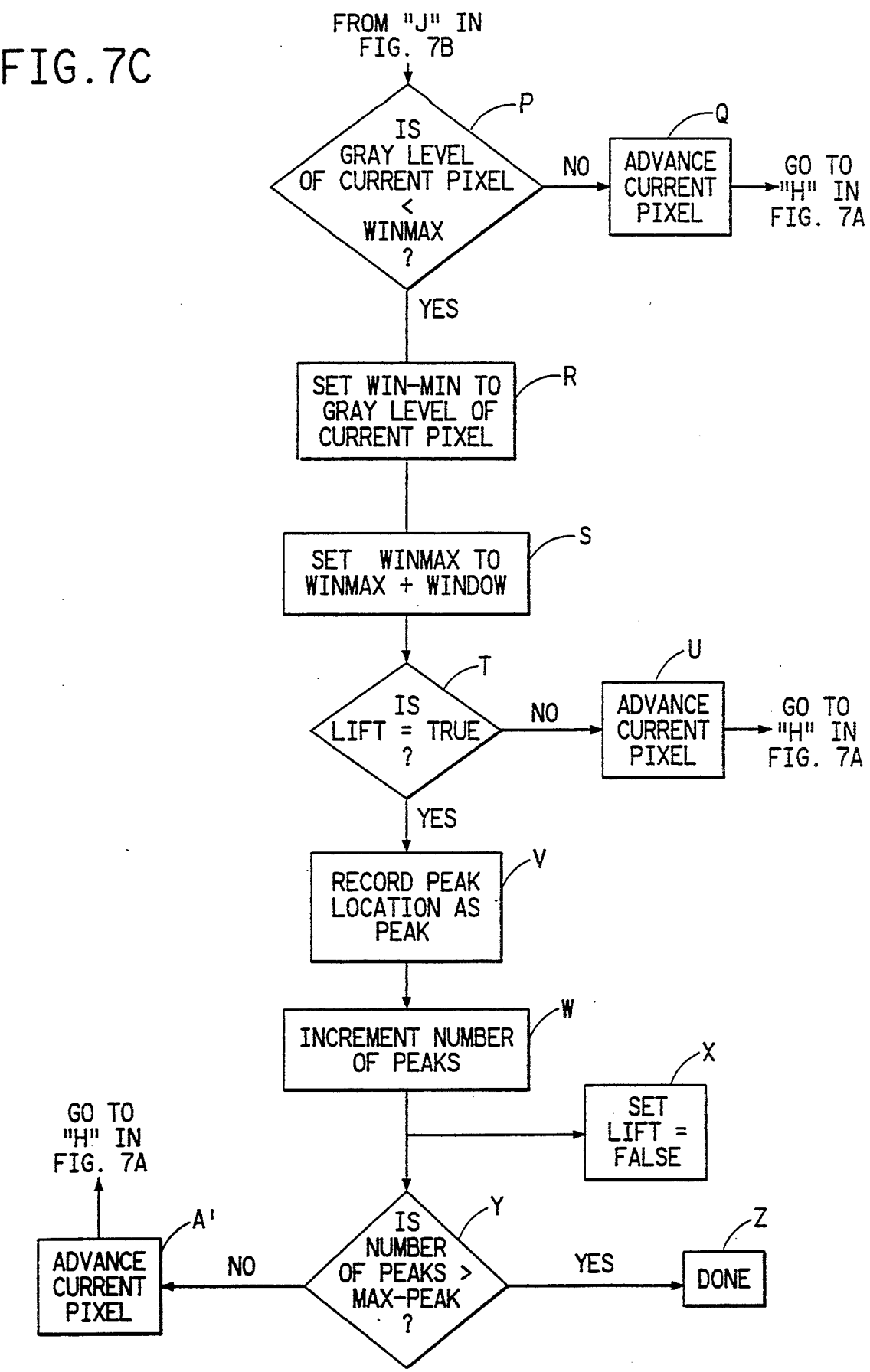

As noted above, the module ENHANCE includes a module, LOCATE PEAKS, which shown in detail in FIGS. 7A–7C. As shown in block A of FIG. 7A, the first step in LOCATE PEAKS is to set the number of peaks to zero. As shown in block B, the lift status variable, "LIFT" is then set equal to "FALSE". The lift status variable determines whether the hysteresis window has been raised since the identification of the previous peak pixel location. When LIFT is "FALSE", the hysteresis window has not been lifted before, and conversely, when LIFT is "TRUE", the hysteresis window has been lifted before. The current pixel is then set to the first pixel in the current line of the image as shown in block C of FIG. 7A. The window size is then set to "WINDOW" as shown in block D, which is a predetermined value of the hysteresis window width as defined in equation (1) above. The minimum gray level value of the window, "WINMIN", is then set to the gray level of the current pixel as shown in block E, and the maximum gray level value of the window, "WINMAX" is set to "WINMIN+WINDOW" as shown in block F. The current pixel is advanced as shown in block G, and then decision diamond H asks whether the current pixel is beyond the end of the line. If it is, then LOCATE PEAKS is done, as shown in block I of FIG. 7A. If the current pixel is not beyond the end of the line, then decision diamond J in FIG. 7B asks whether the gray level of the current pixel is greater than "WINMAX". If it is, then LIFT is set to "TRUE" as shown in block K. The peak location value, "PEAK", is then set to the current pixel as shown in block L, and "WINMAX" is set to the gray level of the current pixel as shown in block M. "WINMAX" is then set to "WINMAX—WINDOW" as shown in block N, and LOCATE PEAKS then advances the current pixel as shown in block O. The module then returns to decision diamond H as shown in FIG. 7A, and the loop through decision diamonds H and J and blocks K–O continues until the current pixel is beyond the end of the current line. At this point, LOCATE PEAKS is done as shown in block I.

Returning to decision diamond J in FIG. 7B, if the gray level of the current pixel is not greater than "WINMAX", then decision diamond P in FIG. 7C asks whether the gray level of the current pixel is less than "WINMIN". If it is, then "WINMIN" is set to the gray level of the current pixel as shown in block R of FIG. 7C, and "WINMAX" is set to "WINMIN+WINDOW" as shown in block S. Decision diamond T then asks whether "LIFT" is equal to "TRUE". If it is, then the peak location is recorded as "PEAK" as shown in block V, and the number of peaks is incremented as shown in block W. "LIFT" is then set equal to "FALSE" as shown in block X. Decision diamond Y then asks whether the number of peaks is greater than "MAXPEAK". If it is, then the module LOCATE PEAKS is done as shown in block Z.

If the number of peaks is not greater than "MAXPEAK", then the current pixel is advanced as shown in block A, and the module returns to decision diamond H in FIG. 7A. The loop through decision diamonds H, J, P, T and Y and blocks I, K, L, M, N, O, Q, R, S, U, V, W, X and Y continues until the number of peaks is greater than "MAXPEAK", at which point, LOCATE PEAKS is done as indicated by block Z.

Returning to decision diamond T, if the lift is not "TRUE", then LOCATE PEAKS advances the current pixel as shown in block U. The loop through decision diamonds H, J, P and T and blocks K, L, M, N, O, Q, R and S continues until the current pixel is beyond the end of the line. At this point, the module LOCATE PEAKS is done as shown in block I of FIG. 7A.

Returning to decision diamond P, if the gray level of the current pixel is not less than "WINMIN", then LOCATE PEAKS advances the current pixel as shown in block Q of FIG. 7C, and the module returns to decision diamond H in FIG. 7A. The loop through decision diamonds H, J and P and blocks I, K, L, M, N and O continues until the current pixel is beyond the end of the line, at which point, LOCATE PEAKS is done as shown in block I of FIG. 7A.

Figure 8C:
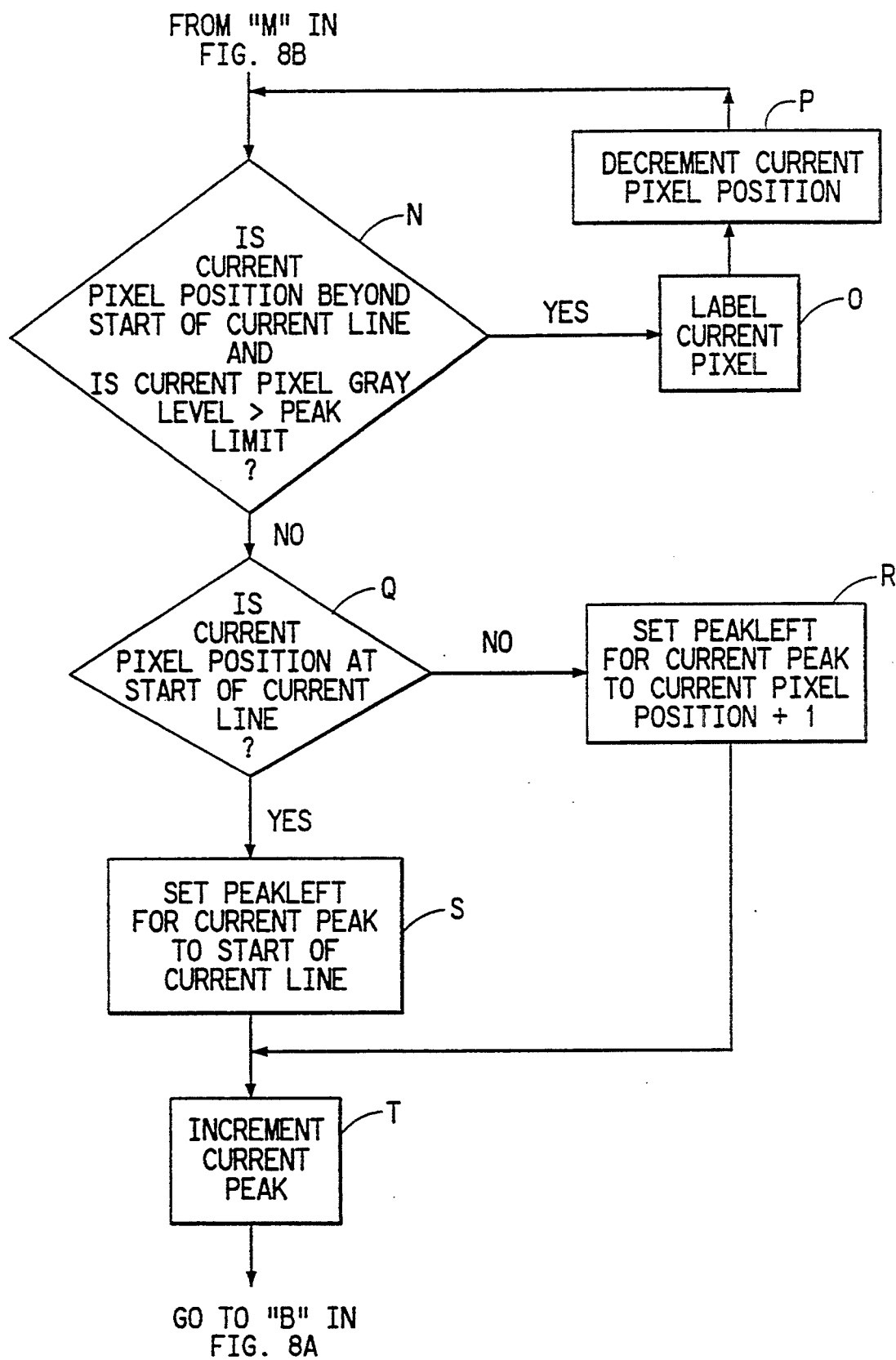

As noted above, the module ENHANCE also includes a module, LABEL PEAKS, which is illustrated in detail in the flow charts of FIGS. 8A–8C. As shown in FIG. 8A, the first step of the module LABEL PEAKS is to set the current peak position to the first peak position in the current line. Then, decision diamond B asks whether the current peak is beyond the last peak in the current line. If it is, then the module LABEL PEAKS is done as shown in block C of FIG. 8A. If the current peak is not beyond the last peak in the current line, then the variable which defines the gray level value of the current peak position, "PEAKGRAY", is set to the gray level of the current peak position as shown in block D. The variable which defines a lower limit of the gray level value of the current peak position, "PEAKLIMIT", is then set to "PEAKGRAY" ×0.75 in the preferred embodiment, and the current pixel position is set to the current peak position as shown in block F.

Decision diamond G of FIG. 8B then asks whether the current pixel is before the end of the current line and the current pixel gray level is greater than "PEAKLIMIT". If it is, then the current pixel is labeled as shown in block H of FIG. 8B, and the current pixel postion is advanced as shown in block I. The loop through decision diamond G and blocks H and I continues until the current pixel is not before the end of the current line and the current pixel gray level is not greater than "PEAKLIMIT". Then decision diamond J asks whether the current pixel is the last pixel of the line. If it is not, then a variable which is indicative of the right most position of the peak, "PEAKRIGHT", is set for the current peak to the current pixel position−1 as shown in block K. Conversely, "PEAKLEFT" is a variable which is indicative of the left most position of the peak. Between "PEAKLEFT" and "PEAKRIGHT" all the pixels have a gray level value which is greater than "PEAKLIMIT". If the current pixel is the last pixel of the line, then "PEAKRIGHT" for the current peak is set to the last pixel of the current line as shown in block L. After either block K or block L, the current pixel position is set to the current peak position as shown in block M.

Decision diamond N in FIG. 8C then asks if the current pixel position is beyond the start of the current line and the current pixel gray level is greater than "PEAKLIMIT". If it is, then the current pixel is labeled as shown in block O of FIG. 8C, and the current pixel position is decremented as shown in block P. The loop through decision diamond N and blocks O and P continues until the current pixel position is not beyond the start of the current line and the current pixel gray level is not greater than "PEAKLIMIT". Decision diamond Q then asks whether the current pixel position is at the start of the current line. If it is not, then "PEAKLEFT" for the current peak is set to the current peak position+1 as shown in block R. If the current pixel position is at the start of the current line, then "PEAKLEFT" for the current peak is set to the start of the current line as shown in block S. After either block R or block S, the current peak is incremented as shown in block T, and the module LABEL PEAKS returns to decision diamond B in FIG. 8A. The loop through B–T continues until the current peak is beyond the last peak in the current line, at which point, LABEL PEAKS is done as indicated by block C of FIG. 8A.

The method of the present invention also comprises the step of searching the labeled image using a selected threshold gray level to locate the edges of the glass fiber bundles. This step is shown generally by block G in FIG. 4. The selected threshold gray level is greater than the maximum gray level of the thermoplastic fibers and less than the predetermined gray level of the labeled peaks. The step of searching the image using a selected threshold gray level intensity is performed by a module SEARCH IMAGE as illustrated in the flow chart of FIG. 9, a module FIND OBJECT as illustrated in the flow chart of FIG. 10.

Figure 9:
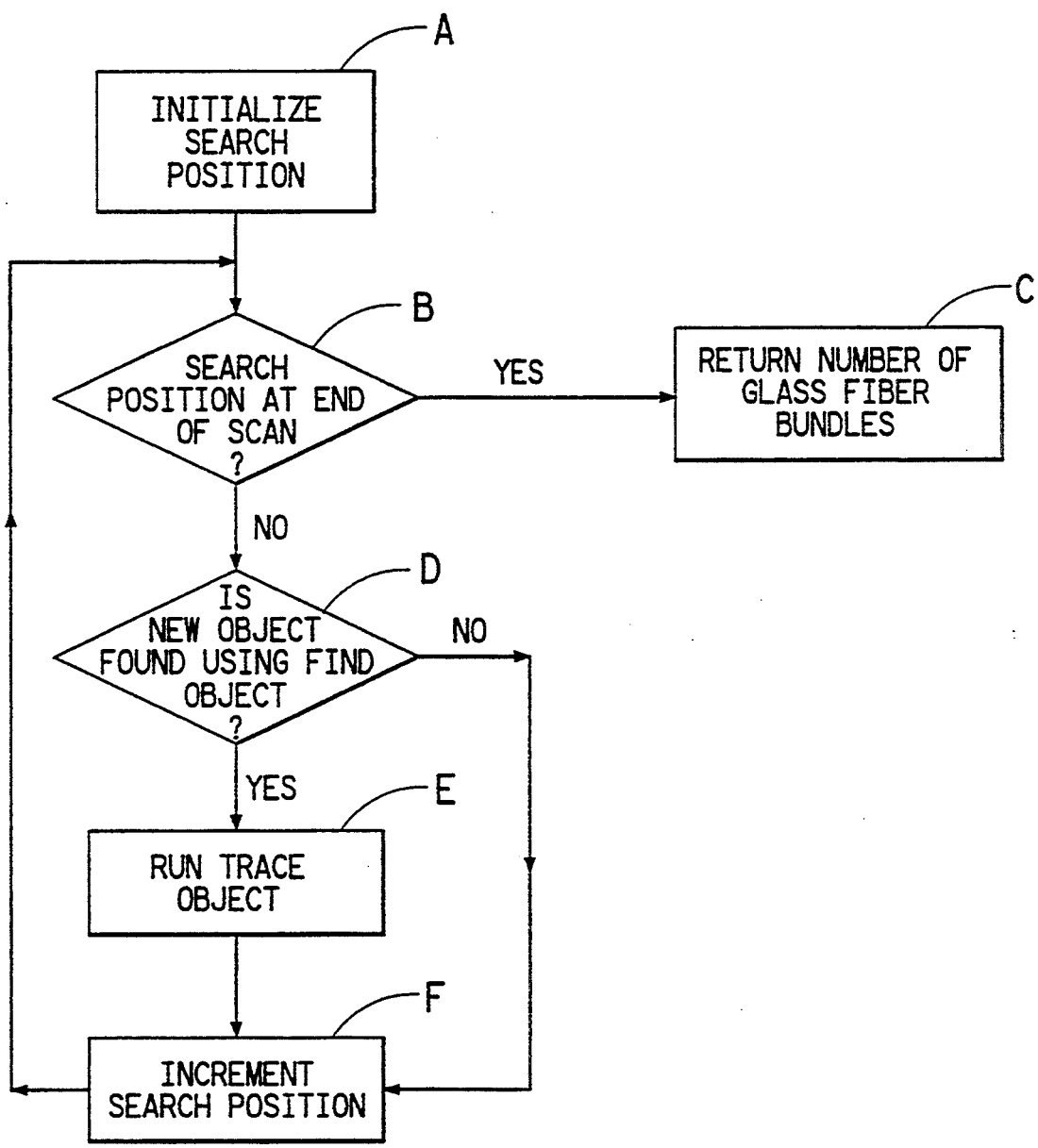
FIG. 9 is a flow chart showing the steps of a module, SEARCH IMAGE, which is used to search the image generated in accordance with the method of the present invention.

As shown in block A of FIG. 9, the first step of SEARCH IMAGE is to initialize the search position. Decision diamond B of FIG. 9 then asks whether the search position is at the end of the scan. If it is, then the number of identified glass fiber bundles in the thermoplastic resin preform layer is returned as shown in block C. If the search position is not at the end of the scan, then the module SEARCH IMAGE searches the region of interest with the current selected threshold gray level until it finds a point which has a gray level exceeding the selected threshold gray level, using a module FIND OBJECT. Such a point might be the first point of a new object, which is potentially a residual glass fiber bundle in the thermoplastic resin preform layer. Decision diamond D of FIG. 9 asks whether a new object has been found using the module FIND OBJECT. If so, FIND OBJECT checks to see if the object has already been traced in the current search. If the object has not already been traced in the current search, the module SEARCH IMAGE proceeds to trace the object by running the module TRACE OBJECT, which is shown in detail in FIGS. 11A and 11B, as shown by block E of FIG. 9. After the object has been traced, the search position is incremented as illustrated in block F of FIG. 9. The loop through B–F continues until the search position is at the end of the scan as in decision diamond B, and the number of glass fiber bundles is returned as shown in block C. Alternatively, if a new object has not been found as indicated by decision diamond D, then the search position is incremented as illustrated in block F, thus by-passing the tracing step, and the loop through B–F is continued until the search position is at the end of the scan, and SEARCH IMAGE is done.

Figure 10:
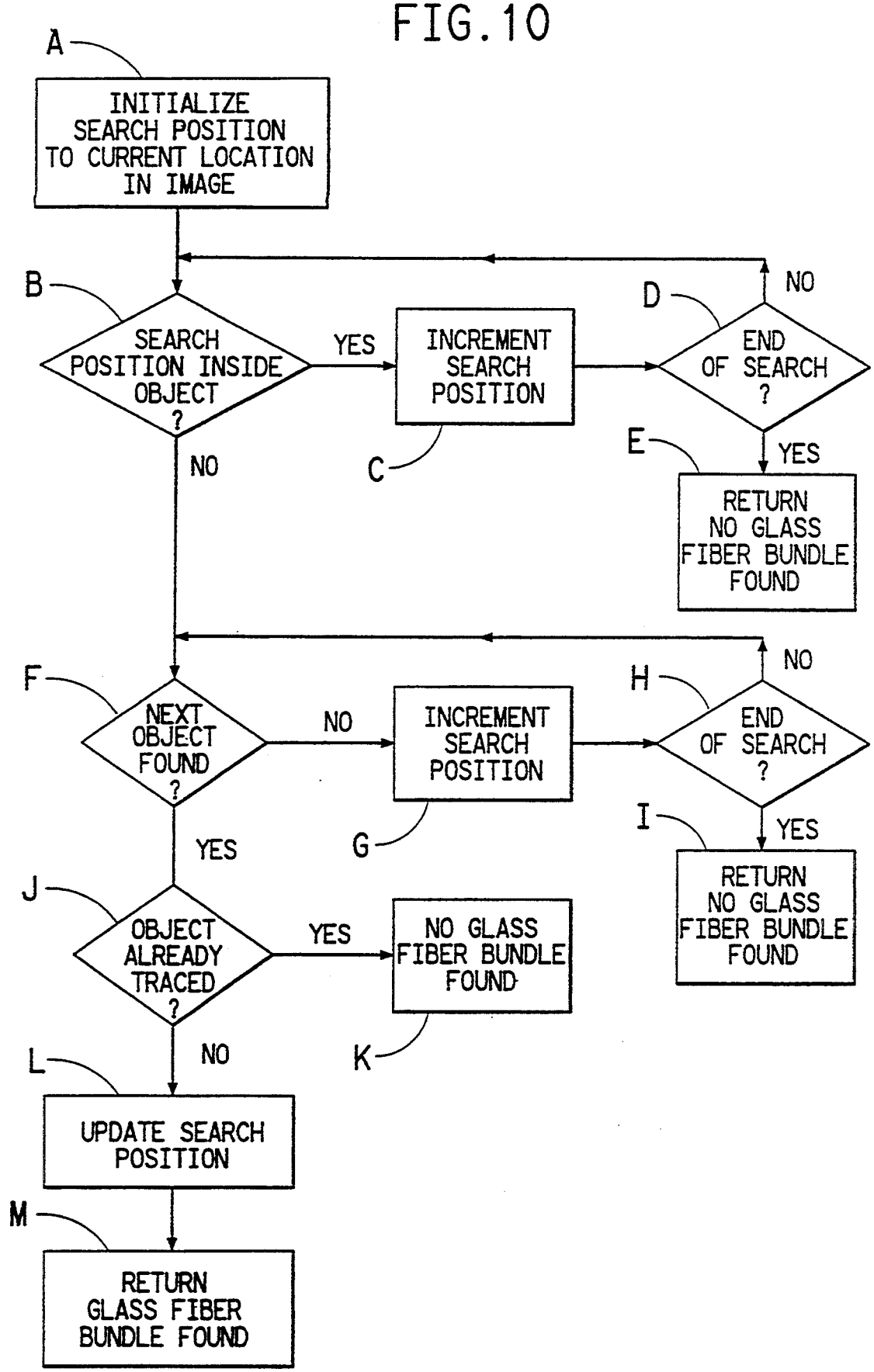
FIG. 10 is a flow chart showing the steps of a module FIND OBJECT, which is also used to search the image generated in accordance with the method of the present invention.

The steps of the module FIND OBJECT are illustrated in the flow chart of FIG. 10. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether FIND OBJECT is at the end of its search. If so, then no new glass fibers are found as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 10, and decision diamond H asks whether the SEARCH IMAGE is at the end of the search. If so, then no new glass fiber bundles are found as indicated by block I. If not, then decision diamond F again asks whether a next object has been found using the incremented search position. This process of looping through F–I continues until a next object has been found. Decision diamond J asks whether the object which has been found has already been traced. If so, then the fact that no new object has been found is returned as indicated by block K. If the object which has been found has not already been traced, then the search position is updated as illustrated by block L, and the fact that a new object has been found is returned as indicated by block M of FIG. 9.

Figure 11B:
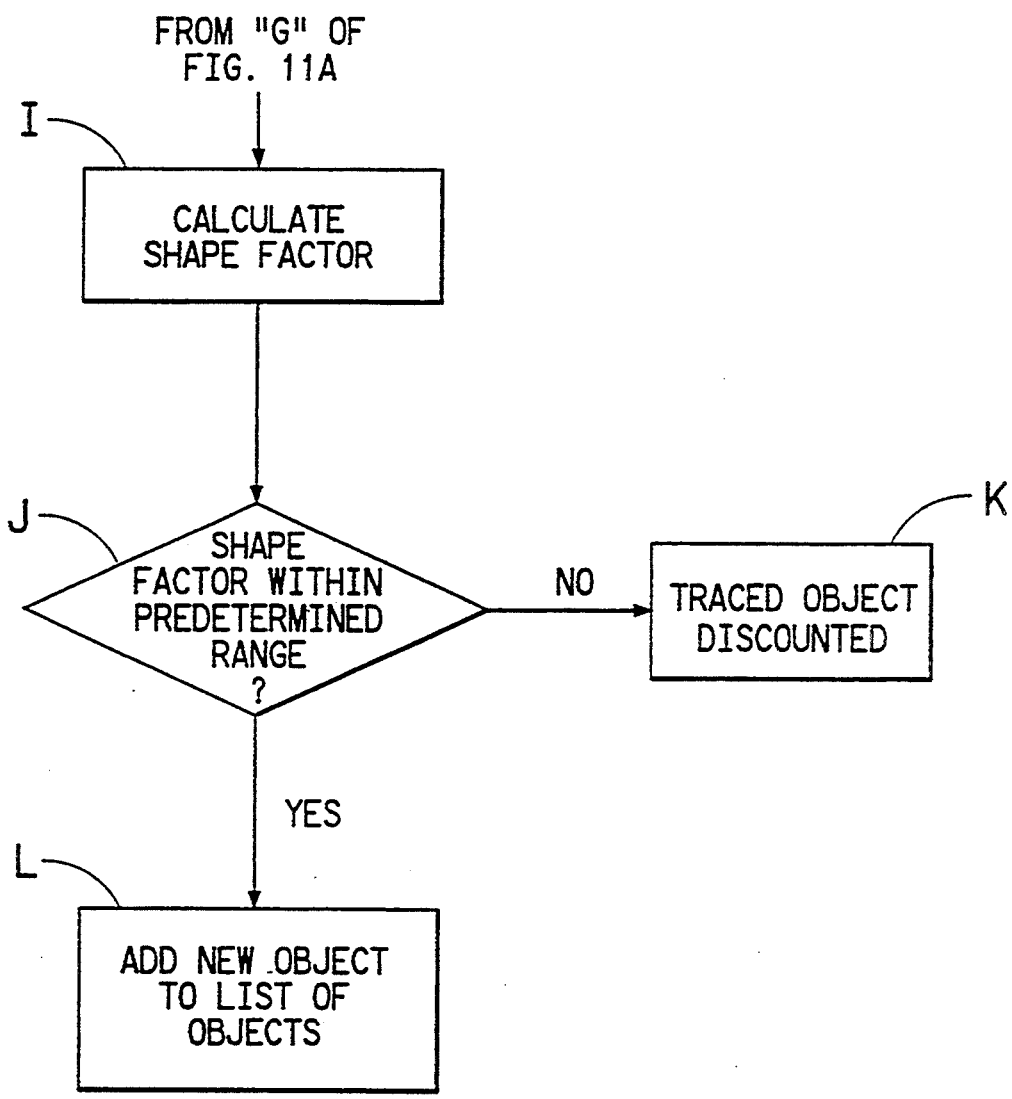

The method of the present invention also comprises the step of tracing the edges of the glass fiber bundles. This step is performed by a module TRACE OBJECT, which is illustrated in FIGS. 11A and 11B. The basic principles of the TRACE OBJECT module are similar to those described in Gonzalez and Wintz, supra. As shown in block A of FIG. 11A, the first step in the TRACE OBJECT module is to initialize the attribute values used to characterize an object, which may be a residual glass bundle in the thermoplastic resin preform layer. When the object is a residual glass bundle, the attribute values used to characterize the bundles are perimeter and area. The TRACE OBJECT module then asks in decision diamond B whether a neighboring perimeter point has been found. If not, the traced object is not a glass fiber bundle as illustrated by block C. If the neighboring perimeter point has been found, then decision diamond D asks whether the TRACE OBJECT module is at the first perimeter point of the new object. If not, then the attribute values of the new object are updated as illustrated in block E of FIG. 11A. The loop through B–E is then repeated until the TRACE OBJECT module is at the first perimeter point of the new object. The center of mass coordinate is then calculated as shown in block F of FIG. 11A. Decision diamond G then asks if the new object area is too large. If it is, the traced object is discounted as being a glass fiber bundle as indicated by block H of FIG. 11A.

If the new object area is not too large, then a shape factor is calculated as shown in block I in FIG. 11B. The definition of the shape factor may vary, depending on the geometry of the object being identified. In the method of the present invention, where glass fiber bundles are identified, the definition of the shape factor used is:

$$\text{Shape Factor} = 1 - \frac{p^2}{4\pi A} \qquad (6)$$

Where: p is the perimeter of a new object; and
A is the area of the new object.

TRACE OBJECT then checks if the shape factor is within a predetermined range, which is wide enough to encompass all glass fiber bundles as shown in decision diamond J in FIG. 11B. If the shape factor does not fall within the predetermined range, then the traced object is discounted as being a glass fiber bundles as illustrated by block K of FIG. 11B. If the shape factor falls within the predetermined range, then the new object is added to the list of glass fiber bundles as shown by block L.

The method of the present invention also comprises the step of calculating a mean characteristic of the glass fiber bundles. The mean characteristic may be the mean apparent length of the glass fiber bundles. Alternatively, the mean characteristic may be the mean width of the glass fiber bundles, which is a direct measurement of the amount of dispersion of glass fibers.

The terminology "apparent length" refers to the fact that the image analysis method does not necessarily measure the actual length of the glass fiber. In some cases, "true" fiber bundles are broken up or seen as series of smaller fiber bundles due to errors in the edge identification process. This "breakup" can also occur due to the fundamental nature in which the fiber bundles are illuminated. Depending on the incidence of the illuminating light with respect to the fiber bundle, the fiber bundle can act either a "light pipe" where it lights up uniformly, or where it appears to be a series of smaller fiber bundles. A potential for error in the measurement method of the present invention resides in the fact that the fiber bundles extend in and out of the plane of the thermoplastic resin preform layer. Although the method is not an absolute measurement, it has proven to be a useful tool to grade the preform layers because the same error is present in all samples.

The mean apparent length of the glass bundles is an attractive measure to quantify the dispersion since it corresponds to an important physical property. In a poorly dispersed system there should be more longer and thus higher contrast (or more easily visible) filaments adhering to each other in bundles than in well dispersed bundles. The combination of image enhancement followed by glass fiber bundle identification described above selects the higher contrast glass fiber bundles which can affect both the aesthetic and mechanical end use properties.

The mean apparent length of the glass fiber bundles located and traced is calculated using the following formula:

$$\text{Apparent length} \approx \text{Perimeter of bundle} \times 0.5 \qquad (7)$$

This approximation is valid for thin bundles.

To verify the reliability of the test method, multiple samples of preform layers were prepared and graded visually as to their quality of dispersion: Good, medium, and poor. The results of the image analysis method of the present invention on ten replicates of each type were as follows:

TABLE 2

|  | GOOD | MEDIUM | POOR |
|---|---|---|---|
| Mean length (mm.) | 1.271 | 1.458 | 1.815 |
| Std dev length | 0.067 | 0.040 | 0.05 |

The mean value of all glass fiber bundle apparent lengths in the image was calculated and used to quantify the quality of dispersion. The average of the good and medium dispersion was calculated to be 1.365 mm. Thus, acceptable dispersion for a glass fiber-reinforced thermoplastic preform layer is characterized as having a mean apparent length of less than 1.365 mm. The difference in mean lengths between types was significantly greater than the standard deviations within each type, indicating a successful classification scheme.

The method of the present invention may further comprise the step of amplifying the gray level intensity distribution of the image after the application of the smoothing filter to maximize the contrast between the glass fiber bundles and the thermoplastic fibers. The basic principles of this amplification step are familiar to one skilled in the art, and are similar to those described in Gonzalez and Wintz, supra. In the preferred embodiment, the image is amplified by setting the maximum grey level of the image to 253 and scaling all other gray levels accordingly in order to maximize the contrast between the glass fiber bundles and the thermoplastic resin.

With the image analysis method of the present invention, the quality of dispersion of glass fiber bundles in a thermoplastic resin preform layer may be determined, and the preform layer may be characterized as to whether has good, medium or poor dispersion and may be distinguished over other preform layers of the prior art. Thus, in accordance with the present invention there is provided a thermoplastic resin preform layer comprising a plurality of individual glass fibers and some degree of undispersed glass fiber bundles intimately mixed with a plurality of discrete thermoplastic fibers. The glass fibers are introduced to the mixture as glass fiber bundles having a length of about 1 cm. to about 8 cm. After mixing, some of the glass fiber bundles break up, and some residual glass fiber bundles remain. A preform layer having acceptable dispersion has residual glass fiber bundles having a mean apparent length of less than about 1.365 mm.

The invention will be clarified by the following examples, which are intended to be purely exemplary of the invention. Examples I–VII are directed to the process of making the preform layer and the preform layer of the present invention formed thereby, and Examples VIII–X are directed to the method for determining the quality of dispersion of glass fiber bundles in the preform layer of the present invention.

EXAMPLE I

In a 150 gallon total capacity Bird Pulper, 50 gallons of deionized water were added. 1.5 pounds of 1.5 denier per filament, 0.25 inch staple length, poly(ethylene terephthalate) (PET) fiber having preapplied to the fiber surface 0.5% by weight of a finish consisting of an equal mixture of tallow alcohol ethoxylate (25 moles) and the potassium salt of the mono and diacid phosphate esters of C-12 alcohol were added and dispersed with the high speed agitator for 5 minutes to create a uniform fiber dispersion. One (1.0) pound of 1-inch chop glass (OCF TYPE 133A) was then added to the mixture with an additional 68 gallons of deionized water gradually, and the batch was agitated for an additional 10 minutes. The pulper was then pumped to a moderately agitated machine supply tank without further dilution such that the consistency was 0.25% by weight solids. The feed stock was then pumped to the headbox of a 12 inch Bruderhaus inclined wire minipaper machine having a 45 degree incline. The stock was diluted at the headbox to a consistency of 0.05%. The head box stock was drained through the forming wire in the usual manner and dewatered by passing over suction slots. The wire speed was 5 fpm and the resulting sheet was captured on a take up roll in damp form. The sheet was then laid out in layers and air dried to ambient moisture level substantially as disclosed in conjunction with FIG. 1. The dry sheet weight was approximately 0.05 pounds per sq. ft. Microscopic cross-sectional analysis showed that the wet chop glass fiber bundles were substantially dispersed (reduced from 1,000 to 2,000 filaments per bundle to not more than a few filaments) and that the thermoplastic fibers were free from bonding with the glass fibers and with one another.

The ambient dried nonwoven sheets were stacked to form a 7×7" batt of basis weight 1 pound/sq. ft. and dried in a vacuum oven to 0.02% by weight moisture or less. The dried batt was quickly transferred to a preheated 7×7 inch picture frame mold coated with Miller-Stephenson MS-136 mold release. The mold and contents were then placed between the platen of a hydraulic press with heated platens. Contact pressure equivalent to 50 psi was then placed on the mold, and it was heated to 290° C. as measured by a thermocouple placed in the side of the mold. When full temperature was reached, the pressure was gradually raised to 600 psi. When the first evidence of flash was noted, at roughly 600 psi, the heaters were turned off, the cooling water to the platens was turned on, and the mold and contents were allowed to cool to room temperature under 600 psi, approximately 15 minutes. The composite plaque was then removed from the mold. Tensile and Flex bar cut from the plaques showed tensile strengths in excess of 24 ksi and a flex modulus of 1.65 million psi. C-scan data showed plaques to be uniformly consolidated, with sound absorption in the range of from about 24 to about 40 DB/inch for a 0.125 inch-thick sample.

EXAMPLE II

The procedure is identical to that described in Example I, except the mold was heated to 250° C., and the PET fiber was replaced by 1.8 denier per filament, 0.25 inch staple length nylon fiber having little or no surface finish. The resulting preform layer, or mat, was observed under the microscope in cross section and showed similar highly dispersed glass filaments or individual fibers in intimate admixture with nylon fibers. Tensile and Flex bar cut from the plaques showed tensile strength of 26.7 ksi and a flex modulus of 1.6 million psi. C-scan data showed plaques to be uniformly consolidated, with sound absorption in the range of from about 24 to about 40 DB/inch for a 0.125 inch-thick sample.

EXAMPLE III

The procedure used in this Example was identical to the procedure described in Example I, except the mold was heated to 200° C., and the PET fiber was replaced by 6 denier per filament, 0.25 inch, staple length polypropylene fiber having the same surface finish as the fiber in Example I. The resulting preform layer, or mat, was observed under the microscope in cross section and showed similar highly dispersed glass filaments, or individual fibers, in intimate admixture with polypropylene fibers. Tensile and Flex bar cut from the plaques showed tensile strengths in excess of 10 ksi and a flex modulus of $>0.7$ million psi.

EXAMPLE IV

The procedure used in this Example was identical to the procedure described in Example I, except that the PET fiber was replaced by the PET fiber containing 0.5% Irganox 1010 antioxidant and 8~ of fine particulate elastomer toughner particles. The preform layer, or mat, was observed under the microscope in cross section and showed similar highly dispersed glass filaments or individual fibers in intimate admixture with polyester fibers. Tensile and Flex bar cut from the plaques showed tensile strength in excess of 22.5 ksi and a flex modulus of 1.4 million psi. C-scan data showed plaques to be uniformly consolidated, with sound absorption in the range of from about 24 to about 40 DB/inch for a 0.125-inch thick sample.

EXAMPLE V

The procedure used in this Example was identical to the procedure described in Example I, except that 0.5-inch length OCF 133A glass was used, instead of 1.0 inch. The preform layer, or mat, was observed under the microscope in cross section and showed similar highly dispersed glass filaments or individual fibers in intimate admixture with polyester fibers. Tensile and flex bar cut from the plaques shown tensile strength in excess of 20 ksi and a flex modulus of 1.43 million psi. C-scan data showed plaques to be uniformly consolidated, with sound absorption in the range of from about 24 to about 40 DB/inch for a 0.125-inch thick sample.

EXAMPLE VI

The procedure used in this Example was identical to the procedure described in Example I, except that 1-inch long OCF type 685 glass was used in place of OCF type 133A, used in Example I. The preform layer, or mat, was observed under the microscope in cross section and showed similar highly dispersed glass filaments or individual fibers in intimate admixture with polyester fibers. Tensile and Flex bar cut from the plaques shown tensile strength in excess of 20 ksi and a flex modulus of 1.43 million psi. C-scan data showed plaques to be uniformly consolidated, with sound absorption in the range of from about 24 to about 40 DB/inch for a 0.125-inch thick sample.

EXAMPLE VII

The ingredients were dispersed in the conventional pulper/blended apparatus in the following manner. Approximately 4000 gallons of water were placed in the pulper. Then 315 pounds of 1.5 denier per filament, 0.25 inch staple length, poly(ethylene terephthalate) fiber having pre-applied to the fiber surface the same finish as in Example I was added and agitated for 10 minutes. Then 240 pounds (dry weight) OCF 133A-AA glass chop and 45 pounds of sheath core binder fiber consisting of 30% sheath of a co-polymer of poly (ethylene terephthalate) having a tack point in the range of 130° C. to 160° C., and a (70%) core of poly (ethylene terephthalate) were added and agitated for an additional fifteen minutes. The consistency for the batch in lbs/lbs water was 1.8% by weight pulper solids.

The resulting uniform, and intimately mixed water dispersion of glass filaments or individual fibers and polymeric fiber was flushed to a holding tank with an additional 10,000 gallons of water, resulting in an agitated feed tank consistency of 0.516% by weight solids.

The feed tank slurry was then feed to the forming chamber box of a conventional inclined wire paper machine and the head box forming consistency was adjusted to 0.057%. The slurry wass drained through the forming wire of the machine in a conventional manner and formed into a homogeneous nonwoven layer, or mat. The layer was first partially dewatered by passing over vacuum suction slots in a conventional manner. Then the layer was dried by passing through a flat, forced air drier with dryer air temperature of 500° F. such that the exit temperature of the mat was measured to be 200° F. The layer was then passed under a set of infrared drying consisting of 6 12-inch wide units with 6 cal-rods each, such that the surface temperature entering the infrared heating zone was 100° F. and exiting was 380° F. Then the layer was passed between a single nip calender with a nip pressure of 100 pli and wound on 6-inch paper tube cores. The line speed of the machine was 22 feet per minute. The layer weight ranged from 196 to 261 lbs/1300 sq. ft.

Microscopic examination of the layer in cross section showed excellent dispersion of the filaments or individual fibers in intimate admixture with the thermoplastic resin fibers.

The ambient dried nonwoven sheets were stacked to form a $7\times7''$ batt of basis weight 1 pound/sq. ft. and dried in a vacuum oven to 0.02% by weight moisture or less. The dried batt was quickly transferred to a preheated $7\times 7$-inch picture frame mold coated with Miller-Stephenson MS-136 mold release. The mold and contents were then placed between the platten of a hydraulic press with heated plattens. Contact pressure equivalent to 15 psi was then placed on the mold, and the mold was heated to 290° C. as measured by a thermocouple placed in the side of the mold. When full temperature was reached, the pressure was gradually raised to 600 psi. When the first evidence of flash was noted at roughly 600 psi, the heaters were turned off, the cooling water to the plattens was turned on, and the mold and contents were allowed to cool to room temperature under 600 psi, approximately 15 minutes. The composite plaque was then removed from the mold. Samples for tensile strength, flex modulus, and other physical property tests were cut from the plaques, and data was taken via standard test procedures to analyze the composite's properties. Results were as follows:

Tensile strength:27 ksi Flex modulus:1.62 million psi

C-scan data showed the plaques to be uniformly consolidated, with sound absorption in the range of from about 24 to about 40 DB/inch for a 0.125-inch thick sample.

EXAMPLE VIII

To a side agitated 8000 gallon blend tank, 7000 gallons of water were added. Approximately, 225 pounds of 2 denier per filament, 0.25 inch (6.35 mm) cut length thermoplastic poly(ethylene terephthalate) fiber containing approximately 0.7% by weight spun-in Ethanox E 330 antioxidant and 0.2% spun-in carbon black, was subsequently added to the tank and dispersed for 10 minutes under high agitation to create a uniform slurry. The thermoplastic fiber had on its surface 0.5% by weight of a finish consisting of an equal mixture of tallow alcohol ethoxylate (25 moles) and the potassium salt of the mono and diacid phosphate ester of C-12 alcohol.

Subsequently, 75 pounds of 0.5 inch (1.27 cm.) cut length wet chop E-glass fiber, OCF Type 133A, the surface of the fiber having a sizing comprising a silane keying agent and polyurethane film forming agent, of average diameter approximately 13 microns, was added to the water and agitated for an additional 20 minutes. This slurry stock (approximately 0.52% consistency=weight solids/weight water×100) was then fed at the rate of 1010 gallons per minute into the recirculating white water loop of a paper rotary inclined wire sheet forming machine, such as that shown in FIG. 2, in the usual manner providing a dilution to about 0.05% consistency at the head box. At the head box a sheet was formed having a dry equivalent basis weight of approximately 0.1 pounds per square foot using a modified inclined rotary wire forming head. The head box stock was drained through the forming wire in the usual manner and dewatered by passing over suction slots. The forming wire speed was 25 fpm and the result was a damp preform layer, or mat, comprising individual glass fibers and some degree of undispersed glass fiber bundles intimately mixed with discrete thermoplastic fibers.

The degree of dispersion in the damp layer was analyzed in the following manner. First the damp layer was passed through a forced hot air oven, such as dryer 30 as shown in FIG. 2, having an air temperature of 540° F. and an air pressure of approximately 5 inches of water, such that the air passed through the porous sample and melted the thermoplastic fibers. Residence time in the drying was 40 seconds, which was sufficient to both dry the product and to melt the thermoplastic fiber, revealing the glass fiber and fiber bundle structure in the preform layer. Samples of this layer of approximately 12 inches by 12 inches were cut and subjected to the image analysis method described above in order to quantify the degree of undispersed glass fiber bundles in the layer. The mean apparent length of the glass fiber bundles in the sample layer was determined to be 1.271, and the layer was considered to have good dispersion.

Figure 12:
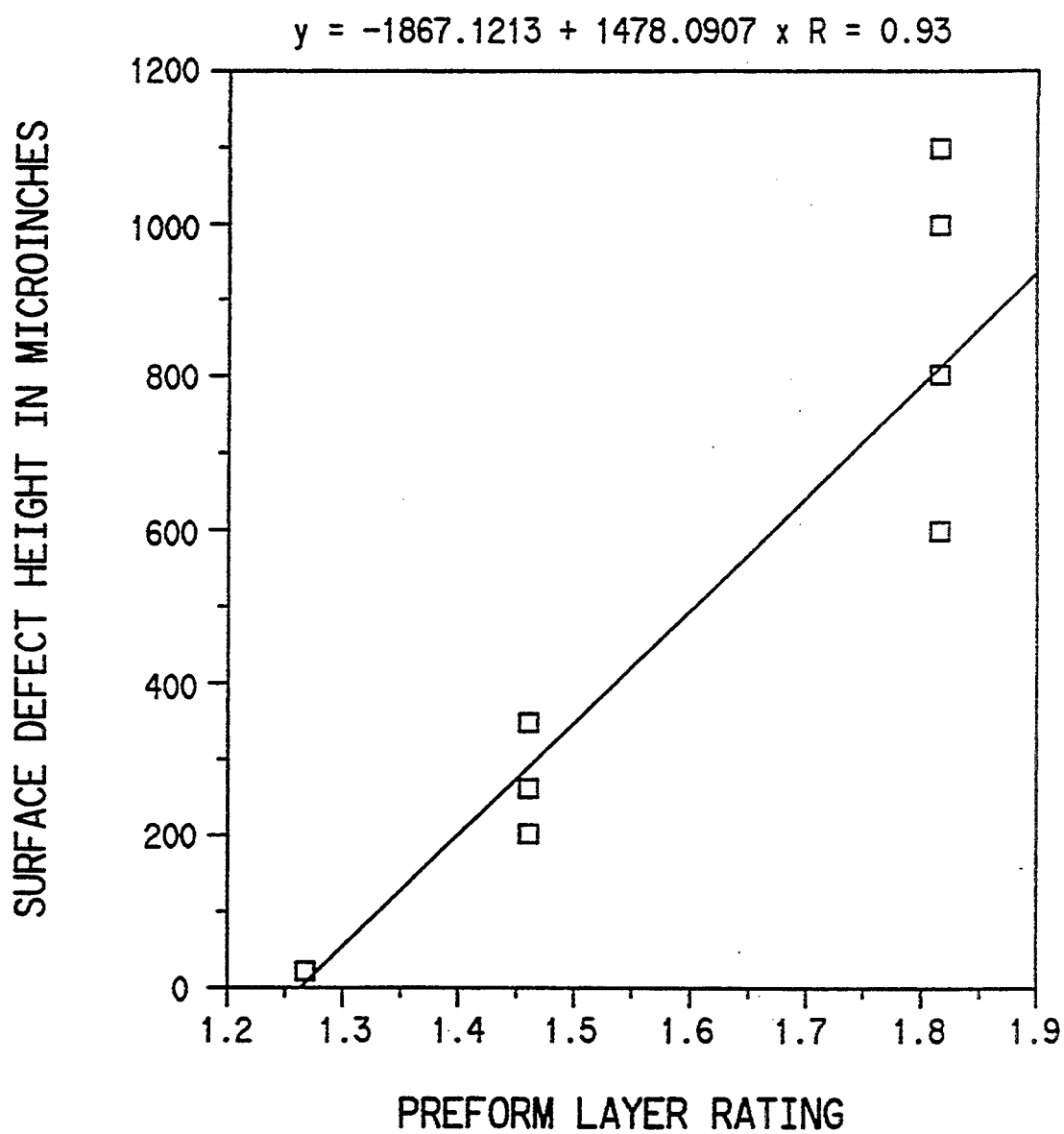
FIG. 12 is a graph showing the preform layer rating versus the molded surface defect height from profilometer tests run for Examples VIII-X.

To correlate the mean apparent length obtained on the preform layer samples with the surface quality of molded parts, preform materials were molded as follows: A preform stack consisting of ten sheets of preform layers, each 13.5 inches square, of bonded material prepared as above, was heated in a forced convection oven employing a frame around the materials to prevent by-passing, for 60 seconds, to melt the thermoplastic polyester resin. The preform layer was then quickly transferred to a heated 14-inch square male female polished tool at 150° C. and mounted in a press. Approximately 2000 psi was applied via a fast closing press to flow form a 100 mil thick 14 inch by 14 inch plaque. The plaques were then coated with a 5-mil thick thermosetting in-mold coating commonly used in the industry for coating compression molded glass reinforced plastic automotive panels. The plaques were removed from the mold and allowed to cool to room temperature. Surface smoothness of the plaques was then evaluated using a profilometer. A maximum defect height in the plaques considered to have good dispersion was less than 0.000020 inches as shown in FIG. 12.

EXAMPLE IX

The procedure used was identical to that used in Example VIII, except that the glass was 1.0 inch (2.54 cm) cut length. In this Example the mean apparent length of the glass fiber bundles in the preform layer was 1.458, which dispersion is considered less satisfactory than that in Example VIII, but still acceptable. The surface of the molded plaque showed a few small defects caused by partially undispersed bundles of glass fiber mixed in with the dispersed glass fibers. The maximum defect height in the plaque of this Example was in the range of 0.000180–0.000350 inches, as shown in FIG. 12.

EXAMPLE X

The procedure used in this Example was identical to that used in Example VII, except that the glass was 1.0 inch (2.54 cm.) cut length and contained numerous "dry" glass bundles, which were allowed to dry in the open air and which did not disperse well. In this Example, the mean apparent length of the glass fiber bundles was 1.815. The molded plaque surface showed numerous major defects caused by the undispersed glass fiber bundles, mixed with the dispersed glass fibers. The maximum defect height in the plaque of this Example was in the range of 0.000600–0.001100 inches, as shown in FIG. 12.

What is claimed is:

1. A method for determining the quality of dispersion of glass fibers in a thermoplastic resin preform layer where the glass fibers have been introduced as glass fiber bundles, comprising the steps of:
    (a) generating an image of a sample of thermoplastic resin preform layer comprising a plurality of individual glass fibers and some degree of undispersed glass fiber bundles intimately mixed with a plurality of discrete thermoplastic fibers, wherein the image has a gray level intensity distribution;
    (b) applying an edge detection filter to enhance the edges of the glass fiber bundles in the image of step (a);
    (c) applying a smoothing filter to the enhanced image of step (b) to reduce the random fluctuations in the gray level intensity distribution of the enhanced image;

(d) scanning each line in the smoothed image of step (c) for peaks in the gray level intensity distribution;

(e) labeling the regions in the image corresponding to the peaks of step (d) with a predetermined gray level;

(f) searching the labeled image of step (e) using a selected threshold gray level to locate the edges of the glass fiber bundles, wherein the selected gray level is greater than the maximum gray level of the thermoplastic fibers and less than the predetermined gray level of the labeled regions;

(g) tracing the edges of the glass fiber bundles;

(h) calculating a mean characteristic of the glass fiber bundles; and (i) comparing the mean characteristic of the glass fiber bundles in the sample to a predetermined value indicative of the quality of dispersion of the glass fiber bundles in the thermoplastic resin preform layer to determine the quality of dispersion of glass fibers.

2. The method of claim 1, further comprising the step of heating the layer before step (a) to melt the thermoplastic fibers and further reveal the structure of the glass fibers in the layer.

3. The method of claim 1, wherein the mean characteristic is the mean apparent length of the glass fiber bundles.

4. The method of claim 1, wherein the mean characteristic is the mean width of the glass fiber bundles.

5. The method of claim 1, further comprising the step of scaling the gray level intensity distribution of the image after step (c) to maximize the contrast between the glass fiber bundles and the thermoplastic fibers.

6. A method for determining the quality of dispersion of glass fibers in a thermoplastic resin preform layer where the glass fibers have been introduced as glass fiber bundles, comprising the steps of:

(a) generating an image of a sample of thermoplastic resin preform layer comprising a plurality of individual glass fibers and some degree of undispersed glass fiber bundles intimately mixed with a plurality of discrete thermoplastic fibers, wherein the image has a gray level intensity distribution;

(b) applying a smoothing filter to the image to reduce the random fluctuations in the gray level intensity distribution of the image of step (a);

(c) applying an edge detection filter to enhance the edges of the glass fiber bundles in the smoothed image of step (b);

(d) scanning each line in the smoothed image of step (c) for peaks in the gray level intensity distribution;

(e) labeling the regions in the image corresponding to the peaks of step (d) with a predetermined gray level;

(f) searching the labeled image of step (e) using a selected threshold gray level to locate the edges of the glass fiber bundles, wherein the selected gray level is greater than the maximum gray level of the thermoplastic fibers and less than the predetermined gray level of the labeled regions;

(g) tracing the edges of the glass fiber bundles;

(h) calculating a mean characteristic of the glass fiber bundles; and (i) comparing the mean characteristic of the glass fiber bundles in the sample to a predetermined value indicative of the quality of dispersion of the glass fiber bundles in the thermoplastic resin preform layer to determine the quality of dispersion of glass fibers.

* * * * *

UNITED STATES PATENT AND TRADEMARK OFFICE
CERTIFICATE OF CORRECTION

PATENT NO. : 5,436,980
DATED : July 25, 1995
INVENTOR(S) : Weeks et al.

It is certified that error appears in the above-indentified patent and that said Letters Patent is hereby corrected as shown below:

On cover page, at box [75] Inventors, please add the following two inventors after Michael J. Merrill:
--Peter Allan Jansson, of Hockessin, Del.
Barry Rubin, of Glen Mills, PA--

Signed and Sealed this

Eighth Day of July, 1997

*Attest:*

BRUCE LEHMAN

*Attesting Officer*    *Commissioner of Patents and Trademarks*